United States Patent
Li et al.

(10) Patent No.: US 12,177,549 B2
(45) Date of Patent: Dec. 24, 2024

(54) CAMERA SYSTEM AND SHAPE MEMORY ALLOY MOTOR

(71) Applicant: Huawei Technologies Co., Ltd., Shenzhen (CN)

(72) Inventors: Xin Li, Shenzhen (CN); Gang Wang, Dongguan (CN); Wei Tang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 232 days.

(21) Appl. No.: 17/780,899

(22) PCT Filed: Nov. 11, 2020

(86) PCT No.: PCT/CN2020/128035
§ 371 (c)(1),
(2) Date: May 27, 2022

(87) PCT Pub. No.: WO2021/104017
PCT Pub. Date: Jun. 3, 2021

(65) Prior Publication Data
US 2023/0022701 A1 Jan. 26, 2023

(30) Foreign Application Priority Data
Nov. 30, 2019 (CN) .......................... 201911209202.6

(51) Int. Cl.
*H04N 23/55* (2023.01)
*H02K 41/035* (2006.01)
(Continued)

(52) U.S. Cl.
CPC ......... *H04N 23/55* (2023.01); *H02K 41/0354* (2013.01); *H04N 23/54* (2023.01); *H04N 23/57* (2023.01)

(58) Field of Classification Search
CPC ........ H04N 23/55; H04N 23/54; H04N 23/57; H04N 23/687; H04N 23/58; H04N 23/50;
(Continued)

(56) References Cited

U.S. PATENT DOCUMENTS 8,848,064 B2 * 9/2014 Topliss .................. H04N 23/68
348/208.7
11,258,951 B2 * 2/2022 Platner ................ H04N 23/687
(Continued)

FOREIGN PATENT DOCUMENTS

CN 102207603 A 10/2011
CN 102739950 A 10/2012
(Continued)

*Primary Examiner* — Chiawei Chen
(74) *Attorney, Agent, or Firm* — Conley Rose, P.C.

(57) ABSTRACT

A camera, camera lens, image sensor, and a shape memory alloy (SMA) motor are stacked within a frame. The SMA motor is located on an out-light side of the camera lens. The image sensor is located between the lens and the SMA motor and is fastened to the SMA motor. The SMA motor is configured to actuate the image sensor to shift on a plane perpendicular to an optical axis of the camera lens. The camera may be associated with an electronic device.

20 Claims, 16 Drawing Sheets

(51) Int. Cl.
*H04N 23/54* (2023.01)
*H04N 23/57* (2023.01)

(58) Field of Classification Search
CPC ........ H02K 41/0354; G03B 2205/0076; G03B 13/36; G03B 30/00; H04M 1/0264; H04M 1/026; H04M 1/0262; H04M 1/0266; H04M 1/0277
See application file for complete search history.

(56) References Cited

U.S. PATENT DOCUMENTS

| | | | | |
|---|---|---|---|---|
| 12,044,219 | B2* | 7/2024 | Miller | F16M 11/048 |
| 2009/0295986 | A1* | 12/2009 | Topliss | G02B 7/026 |
| | | | | 396/73 |
| 2011/0102920 | A1 | 5/2011 | Shyu et al. | |
| 2011/0235194 | A1 | 9/2011 | Nobe et al. | |
| 2011/0249131 | A1* | 10/2011 | Topliss | G03B 5/00 |
| | | | | 348/208.7 |
| 2012/0050896 | A1* | 3/2012 | Nobe | F03G 7/065 |
| | | | | 359/824 |
| 2012/0251088 | A1 | 10/2012 | Huang et al. | |
| 2013/0044382 | A1 | 2/2013 | Phoon et al. | |
| 2013/0222685 | A1* | 8/2013 | Topliss | G02B 27/646 |
| | | | | 348/373 |
| 2013/0300880 | A1 | 11/2013 | Brown et al. | |
| 2015/0135703 | A1* | 5/2015 | Eddington | G02B 27/646 |
| | | | | 60/528 |
| 2015/0168668 | A1* | 6/2015 | Wu | G02B 7/08 |
| | | | | 359/557 |
| 2015/0346507 | A1* | 12/2015 | Howarth | F03G 7/06 |
| | | | | 60/527 |
| 2017/0075192 | A1* | 3/2017 | Brown | G03B 5/04 |
| 2017/0104902 | A1* | 4/2017 | Kim | G02B 7/1822 |
| 2018/0171991 | A1* | 6/2018 | Miller | F16M 11/125 |
| 2018/0284475 | A1 | 10/2018 | Howarth et al. | |
| 2018/0321503 | A1* | 11/2018 | Brown | G02B 27/646 |
| 2019/0361225 | A1 | 11/2019 | Cho et al. | |
| 2020/0277941 | A1* | 9/2020 | Eddington | F16F 1/027 |
| 2022/0106941 | A1* | 4/2022 | Easton | F03G 7/06 |
| 2022/0141357 | A1* | 5/2022 | Easton | H05B 47/16 |
| | | | | 348/340 |
| 2022/0269037 | A1* | 8/2022 | Fan | G02B 27/646 |
| 2022/0357567 | A1* | 11/2022 | Zhao | G02B 23/08 |

FOREIGN PATENT DOCUMENTS

| | | |
|---|---|---|
| CN | 103529536 A | 1/2014 |
| CN | 107079090 A | 8/2017 |
| CN | 107493421 A | 12/2017 |
| CN | 107682604 A | 2/2018 |
| CN | 108141541 A | 6/2018 |
| CN | 109061827 A | 12/2018 |
| CN | 208207475 U | 12/2018 |
| WO | 2019086855 A2 | 5/2019 |

\* cited by examiner

CAMERA SYSTEM AND SHAPE MEMORY ALLOY MOTOR

This is a U.S. National Stage of International Patent Application No. PCT/CN2020/128035 filed on Nov. 11, 2020, which claims priority to Chinese Patent Application Ser. No. 201911209202.6 filed on Nov. 30, 2019. Both of the aforementioned applications are hereby incorporated by reference in their entireties.

TECHNICAL FIELD

Embodiments of this application relate to the field of photographing technologies, and in particular, to a camera module and an electronic device.

BACKGROUND

As a photographing function of a smartphone camera becomes increasingly powerful, an optical image stabilizer (optical image stabilizer, OIS) gradually becomes one of main selling points and competitive edges of the smartphone camera. The optical image stabilizer is configured to detect and feed back jitter of a smartphone in real time within a specific frequency and amplitude range and perform reverse compensation on the jitter during photographing. Because the compensation is usually obtained by correcting an optical path through an optical camera lens (lens), compared with improving a gain by using a software algorithm, the optical image stabilizer ensures a good image quality with minor loss.

Currently, a common optical image stabilization motor is mainly a voice coil motor (voice coil motor, VCM). The voice coil motor includes a motor frame, a carrier, and four pairs of actuating members, and the carrier and the actuating members are located within the motor frame. The carrier is configured to carry a camera lens, and the four pairs of actuating members are separately located around the carrier. Each pair of actuating members includes a magnet and a coil, one of the magnet and the coil is fastened to the carrier, and the other is fastened to the motor frame. Controlling on/off and a magnitude of a current passing through the coils of the four pairs of actuating members enables the carrier together with the camera lens to shift on a plane perpendicular to an optical axis of the camera lens. This implements optical image stabilization in a camera lens shift (lens shift) manner.

When the voice coil motor shifts the camera lens, electromagnetic forces between the voice coils and the magnets are required to actuate the camera lens, the carrier, and the four voice coils or the four magnets fastened to the carrier to shift at the same time. Consequently, such a heavy load leads to a high image stabilization power consumption of the voice coil motor.

SUMMARY

An objective of embodiments of this application is to provide a camera module with a low image stabilization consumption and an electronic device.

According to a first aspect, embodiments of this application provide a camera module. The camera module includes a module frame, a camera lens, an image sensor, and an SMA motor, where the camera lens, the image sensor, and the SMA motor are stacked within the module frame. The SMA motor is located on an out-light side of the camera lens. The image sensor is located between the camera lens and the SMA motor and is fastened to the SMA motor. The SMA motor is configured to actuate the image sensor to shift on a plane perpendicular to an optical axis of the camera lens.

In this embodiment, as weight of the image sensor is greatly reduced compared with that of the camera lens, the camera module implements image stabilization by shifting the image sensor. In this way, an actuation load of the SMA motor may be reduced to lead to a low image stabilization power consumption of the SMA motor. Consequently, the camera module has a low image stabilization power consumption.

In addition, due to a light convergence effect of the camera lens, compared with a conventional solution of shifting a camera lens to perform image stabilization, this embodiment provides the camera module that requires a shorter compensated shift distance to actuate the image sensor to perform optical path compensation via the SMA motor. In this way, the power consumption of the SMA motor is further reduced, so that the camera module has a lower image stabilization power consumption. In other words, under a same power consumption, the camera module in this embodiment has better image stabilization performance than the conventional solution.

It may be understood that, in this embodiment when same image stabilization performance is achieved, how much the compensated shift distance of the image sensor decreases by compared with a compensated shift distance of a conventional camera lens is related to a lens structure of the camera lens. An expected compensated shift distance range of the image sensor may be obtained by optimizing the camera lens structure, so that the camera module has better performance, for example, a lower power consumption, a higher image stabilization feedback speed, and the like.

In an optional embodiment, the SMA motor includes an upper motor component, a lower motor component, a plurality of holds, and four SMA cables. The image sensor is fastened to the upper motor component. The lower motor component is located on a side of the upper motor component away from the image sensor. The plurality of holds are located between the lower motor component and the upper motor component. One end of each of the plurality of holds is fixedly connected to the lower motor component. The other end of each of the plurality of holds is slidably connected to the upper motor component. One end of each SMA cable is fastened to the upper motor component, the other end of each SMA cable is fastened to the lower motor component. The SMA cable shrinks when being electrified and heated.

In this embodiment, heat generated when the SMA cables are electrified leads to a temperature rise of the SMA cables, so that a low-temperature martensite phase is transformed into a high-temperature austenite phase through a reverse phase transformation. The SMA cables are restored to what they were before deformation. In this way, the SMA cables shrink. A length change due to shrinkage of the SMA cables is essentially caused by transformation between material crystal phase structures, to be specific, the transformation between martensite and austenite. Gravity generated due to a crystal structure change (that is, a gap change between atoms) between microscopic particles makes a pulling force generated when the macro SMA cables shrink much greater than electromagnetic forces between common magnet coils. Therefore, the SMA cables may shrink to actuate a heavier load, that is, may implement a large load. In this way, the SMA motor can implement a large actuation force with a small size.

In this embodiment, the SMA cables may shrink when being electrified and heated, to generate a corresponding pulling force on the upper motor component. The camera module may control electrical signals in the four SMA cables, so that the four SMA cables apply a combined force to the upper motor component in an expected direction. In this way, the upper motor component together with the image sensor is actuated to shift to an expected position in the expected direction, so that the camera module may implement image stabilization by shifting the image sensor.

In addition, compared with a conventional image stabilization motor (that is, a voice coil motor), the SMA motor uses a cable actuation manner instead of a magnetic field actuation manner, so that the structure of the SMA motor is simpler. This simpler structure of the SMA motor helps miniaturizing the camera module, and may reduce magnetic interference caused by the camera module to an ambient environment.

As a carrier carrying the image sensor, the upper motor component only needs to implement a carrying function and a simple electrical connection relationship. Therefore, compared with a carrier of a conventional image stabilization motor, the upper motor component has a simpler structure, and may be smaller and lighter. In this way, the SMA motor has a small load which leads to a low image stabilization power consumption of the camera module.

In some optional embodiments, the four SMA cables are in pairs, the two pairs of SMA cables are symmetrically disposed relative to a first reference plane. Two SMA cables of a same pair are symmetrically disposed relative to a second reference plane. Both the first reference plane and the second reference plane are traversed by the optical axis of the camera lens.

In this embodiment, a position relationship among the four SMA cables is limited, so that the camera module can control the combined force applied by the four SMA cables to the upper motor component to shift along the first reference plane or shift along the second reference plane by controlling the electrical signals in the four SMA cables. In addition, a combined shift of the shift on the first reference plane and the shift on the second reference plane enables the upper motor component together with the image sensor to shift to any position in an XY plane (that is, the plane perpendicular to the optical axis of the camera lens) of the camera module. In this way, the image sensor implements sensor-shift image stabilization.

In an optional embodiment, the upper motor component includes a first side and a second side. The first side and the second side are symmetrically disposed relative to the second reference plane. The lower motor component includes a middle region facing the upper motor component and edge regions disposed around the middle region. The plurality of holds are fastened to the middle region. The edge regions include a first edge region and a fourth edge region. The first edge region and the fourth edge region are symmetrically disposed relative to the first reference plane. The first edge region and the first side are correspondingly disposed.

The four SMA cables include a first SMA cable, a second SMA cable, a third SMA cable, and a fourth SMA cable. One end of the first SMA cable is fastened to an end of the first side of the upper motor component close to the second side. The other end of the first SMA cable is fastened to one end of the first edge region of the lower motor component close to the fourth edge region. The second SMA cable and the first SMA cable are symmetrically disposed relative to the second reference plane. The third SMA cable and the second SMA cable are symmetrically disposed relative to the first reference plane. The fourth SMA cable and the third SMA cable are symmetrically disposed relative to the second reference plane.

In this embodiment, one end of each of the SMA cables is fastened at a diagonal position of the upper motor component, and the other end of the SMA cable is fastened at a diagonal position of the lower motor component, so that the SMA cable may have a sufficient length when space in the SMA motor is limited. In this way, the SMA cable has a sufficient amount of expansion, so that the SMA motor may have a larger actuation stroke range to lead to a better image stabilization performance of the camera module.

In an optional embodiment, the SMA motor further includes two spring arms that are L-shaped, and each of the spring arms includes a fixed end and a movable end. The movable ends of the spring arms are fastened to the upper motor component, and the fixed ends of the spring arms are fastened to the middle region. The two spring arms are disposed in a centrosymmetric manner, and a symmetric center of the two spring arms is an intersection line of the first reference plane and the second reference plane.

In this embodiment, by the disposition of the spring arms, the SMA motor can balance and buffer a force applied to the upper motor component w % ben the SMA cables are electrified to actuate the upper motor component to shift together with the image sensor. This makes the upper motor component shift more stably. In addition, when the SMA cables are powered off, the SMA motor can also actuate the upper motor component together with the image sensor to shift back to an initial position by using an elastic force generated by deformation of the spring arms when the SMA cables are electrified to actuate the upper motor component to shift.

In addition, the fixed ends of the spring arms are fastened to the middle region of the lower motor component, so that activity space of the spring arms does not overlap with activity space of the SMA cables. This may avoid interference between the spring arms and the SMA cables in a shifting process of the upper motor component.

In an optional embodiment, each of the spring arms includes a first branch and a second branch connected to the first branch. One of one end of the first branch away from the second branch and one end of the second branch away from the first branch is a movable end of the spring arm, and the other is a fixed end of the spring arm. The upper motor component further includes a fourth side. The fourth side and the first side are symmetrically disposed relative to the first reference plane. A first branch of one of the two spring arms is parallel to the first side. A second branch of one of the two spring arms is parallel to the fourth side.

In this embodiment, shapes and positions of the two spring arms adapt to the upper motor component, so that the two spring arms have a better balance and buffer effect on the upper motor component.

In some embodiments, peripheral sides of the upper motor component are partially recessed to form two L-shaped avoidance grooves. Each avoidance groove extends from one side of the upper motor component to another side of the upper motor component. The two spring arms are respectively disposed corresponding to the two avoidance grooves. The movable ends of the spring arms are fastened to side walls of the avoidance grooves, and the side walls of the avoidance grooves are connected to the peripheral sides of the upper motor component.

In this embodiment, for the SMA motor, the avoidance grooves of the upper motor component and space below the avoidance grooves are used as mounting space and activity space of the spring arms, so that the spring arms and the upper motor component are disposed more compactly. In this way, the SMA motor is easier to be miniaturized.

In an optional embodiment, the SMA motor further includes four spring arms, and each of the spring arms includes a fixed end and a movable end. The movable ends of the spring arms are fastened to the upper motor component and the fixed ends of the spring arms are fastened to the middle region. The four spring arms are in pairs, and the two pairs of spring arms are symmetrically disposed relative to the first reference plane. Two spring arms of a same pair are symmetrically disposed relative to the second reference plane.

In this embodiment, by the disposition of the spring arms, the SMA motor can balance and buffer a force applied to the upper motor component when the SMA cables are electrified to actuate the upper motor component to shift together with the image sensor. This makes the upper motor component shift more stably. In addition, when the SMA cables are powered off, the SMA motor can also actuate the upper motor component together with the image sensor to shift back to an initial position by using an elastic force generated by deformation of the spring arms when the SMA cables are electrified to actuate the upper motor component to shift. In addition, a disposition relationship of the four spring arms corresponds to a disposition relationship of the SMA cables. Therefore, the four spring arms may better implement a balance function and a restoration function.

In addition, the fixed ends of the spring arms are fastened to the middle region of the lower motor component, so that activity space of the spring arms does not overlap with activity space of the SMA cables. This may avoid interference between the spring arms and the SMA cables in a shifting process of the upper motor component.

For example, the four spring arms may be respectively parallel to the four sides of the upper motor component.

In an optional embodiment, the SMA motor further includes a circuit board. The circuit board is located on a side of the lower motor component away from the upper motor component and is fixedly connected to the module frame. The image sensor is electrically connected to the circuit board through a plurality of bonding wires.

In this embodiment, the bonding wires may be gold wires or the like. Each bonding wire is long. When the image sensor shifts with the upper motor component relative to the lower motor component, the image sensor shifts relative to the circuit board, and the bonding wires are adaptively deformed with a shift of the image sensor. The long bonding wires are easier to be deformed and are unlikely to break, so that the bonding wires are highly reliable, and a service life of the camera module is long.

In an optional embodiment, the SMA motor further includes a circuit board, the circuit board is located on a side of the lower motor component away from the upper motor component and is fixedly connected to the module frame. A first electric-conductor is disposed on the upper motor component, a second electric-conductor is disposed on the hold, and a third electric-conductor and a fourth electric-conductor are disposed on the lower motor component. The third electric-conductor electrically connects the circuit board to one end of the SMA cable, and the other end of the SMA cable is electrically connected to the first electric-conductor. The first electric-conductor is electrically connected to the fourth electric-conductor through the second electric-conductor. The fourth electric-conductor is electrically connected to the circuit board.

In this embodiment, the circuit board, the third electric-conductor, the SMA cable, the first electric-conductor, the second electric-conductor, and the fourth electric-conductor form a loop. The circuit board can supply power to the SMA cable, so as to control a shrinkage status of the SMA cable through an electrical signal.

It may be noted that, the camera module inputs different electrical signals into different SMA cables, so that the different SMA cables can shrink independently of each other. In some embodiments, channels corresponding to the different SMA cables are independent of each other. For example, there are four first electric-conductors, four second electric-conductors, four third electric-conductors, and four fourth electric-conductors. One third electric-conductor, one SMA cable, one first electric-conductor, one second electric-conductor, and one fourth electric-conductor form one channel, so that the SMA motor forms four channels independent of each other. In some other embodiments, the channels corresponding to the different SMA cables are partially shared, to simplify a circuit structure. For example, there are four third electric-conductors, one first electric-conductor, one second electric-conductor, and one fourth electric-conductor. The four third electric-conductors are respectively connected to one end of each of the four SMA cables. The other ends of the four SMA cables are all connected to the first electric-conductor. The second electric-conductor is connected to the first electric-conductor and the fourth electric-conductor. In this embodiment, channels of different SMA cables have different positive inputs and a same negative output, and the channels of the different SMA cables may still input different electrical signals.

The first electric-conductor, the second electric-conductor, the third electric-conductor, and the fourth electric-conductor each may have a plurality of implementation structures, including but are not limited to a conducting wire, a conductive patch, a conductive mechanical part, or the like. For example, the first electric-conductor may be a part of a circuit of the upper motor component, and the third electric-conductor and the fourth electric-conductor each may be a part of a circuit of the lower motor component. The second electric-conductor may be formed by electroplating, or may be formed by bonding a flexible circuit board, or may be formed by embedding metal through insert molding.

In some embodiments, the camera module may further include an IR cut filter. The IR cut filter is mounted within the module frame and located between the camera lens and the image sensor. In a thickness direction Z of the camera module, the IR cut filter, the camera lens, and the image sensor are stacked with each other at intervals. The IR cut filter is configured to filter infrared light, to improve imaging quality of the camera module. For example, the IR cut filter may be made of blue glass.

In an optional embodiment, the camera lens includes a lens tube and at least one lens fastened in the camera lens, and the lens tube is fixedly connected to the module frame. In this embodiment, the lens tube is fixedly connected to the module frame with a simple connection relationship, so that a structure of the camera module is simplified, costs of the camera module are reduced, and miniaturization of the camera module is implemented.

In this embodiment, because the SMA motor actuates the image sensor to shift on the plane perpendicular to the optical axis of the camera lens, the image sensor does not shift relative to the module frame in a direction of the optical axis of the camera lens. The camera lens is fastened relative to the module frame, so that in the direction of the optical axis of the camera lens, a distance between the image sensor and the camera lens remains unchanged. The camera lens is a prime camera lens, and the camera module is an image stabilization prime module.

In an optional embodiment, the camera module further includes a voice coil motor. The voice coil motor is fastened within the module frame. The camera lens is mounted on the voice coil motor. The voice coil motor is configured to actuate the camera lens to shift in the direction parallel to the optical axis of the camera lens.

In this embodiment, the camera module may actuate, through the SMA motor, the image sensor to shift on the plane perpendicular to the optical axis of the camera lens, so that a position of the image sensor relative to the camera lens changes, to implement image stabilization. The camera module may further actuate, through the voice coil motor, the camera lens to shift, so that a distance between the camera lens and the image sensor in the direction parallel to the optical axis of the camera lens changes, to implement auto focus. In other words, the camera module has functions of auto focus and optical image stabilization.

In an optional embodiment, the camera lens includes a lens tube and at least one lens fastened in the camera lens. The voice coil motor includes a motor frame, a magnet component, a voice coil, an upper spring, and a lower spring. The motor frame is located within the module frame and is fixedly connected to the module frame. The magnet component is fastened within the motor frame. The camera lens is located in the magnet component. The voice coil is located between the lens tube and the magnet component and is fixedly connected to the lens tube. When the voice coil is electrified, the camera lens is actuated to shift in the direction parallel to the optical axis of the camera lens. One side of the upper spring is fixedly connected to the upper end of the lens tube, and the other side of the upper spring is fixedly connected to the motor frame. One side of the lower spring is fixedly connected to the lower end of the lens tube, and the other side of the lower spring is fixedly connected to the motor frame.

In an optional embodiment, the camera module further includes a prism, the prism is fastened within the module frame and is located on an in-light side of the camera lens. The module frame has an in-light hole that is disposed facing the prism.

A conventional periscope camera module is provided with a plurality of groups of prism actuating motors, and the prism actuating motors actuate the prism to rotate to implement image stabilization. This structure is complex and difficult to implement, and has poor reliability. In this embodiment, the camera module actuates, through the SMA motor, the image sensor to shift on the plane perpendicular to the optical axis of the camera lens, so as to implement optical image stabilization. Therefore, compared with a conventional solution, this embodiment provides the camera module in which a prism actuating motor may be omitted, and the prism is fastened on the module frame. In this way, the module structure is simplified and the structure reliability is improved if long-focus image stabilization performance is achieved.

According to a second aspect, embodiments of this application further provides an electronic device. The electronic device includes a housing, a processor, and the camera module according to any one of the forging. The processor and the camera module are accommodated in the housing, and the camera module is electrically connected to the processor. When the electronic device uses the camera module to perform photographing, a power consumption is low.

DESCRIPTION OF EMBODIMENTS

The following describes embodiments of this application with reference to the accompanying drawings in the following embodiments of this application.

Embodiments of this application provide a camera module and an electronic device to which the camera module is applied. The camera module uses a shape memory alloy (shape memory alloy. SMA) motor to actuate an image sensor to shift on a plane perpendicular to an optical axis of a camera lens. In this way, optical path offset compensation is implemented by shifting the image sensor, so that the camera module has an optical image stabilization function.

The SMA motor includes an upper motor component and a plurality of SMA cables connected to the upper motor component. The image sensor is fastened to the upper motor component. The SMA motor actuates the upper motor component to shift together with the image sensor by controlling electrical signals in the plurality of SMA cables. Therefore, the SMA motor has a simple structure and a small size. An actuation load of the SMA motor is the upper motor component and the image sensor with a small weight. Therefore, the SMA motor has a small actuation load and a low power consumption.

In addition, due to a light convergence effect of the camera lens, compared with a conventional solution of shifting a camera lens to perform image stabilization, this embodiment provides the camera module that requires a shorter compensated shift distance (a stroke) to actuate the image sensor to perform optical path compensation via the SMA motor. In this way, the power consumption of the SMA motor is further reduced, so that the camera module has a lower image stabilization power consumption.

The electronic device may be a mobile phone, a tablet computer, a notebook computer, a camera, a wearable device, a television, or the like. The wearable device may be a smart band, a smart watch, a smart head-mounted display, smart glasses, or the like.

Figure 1:
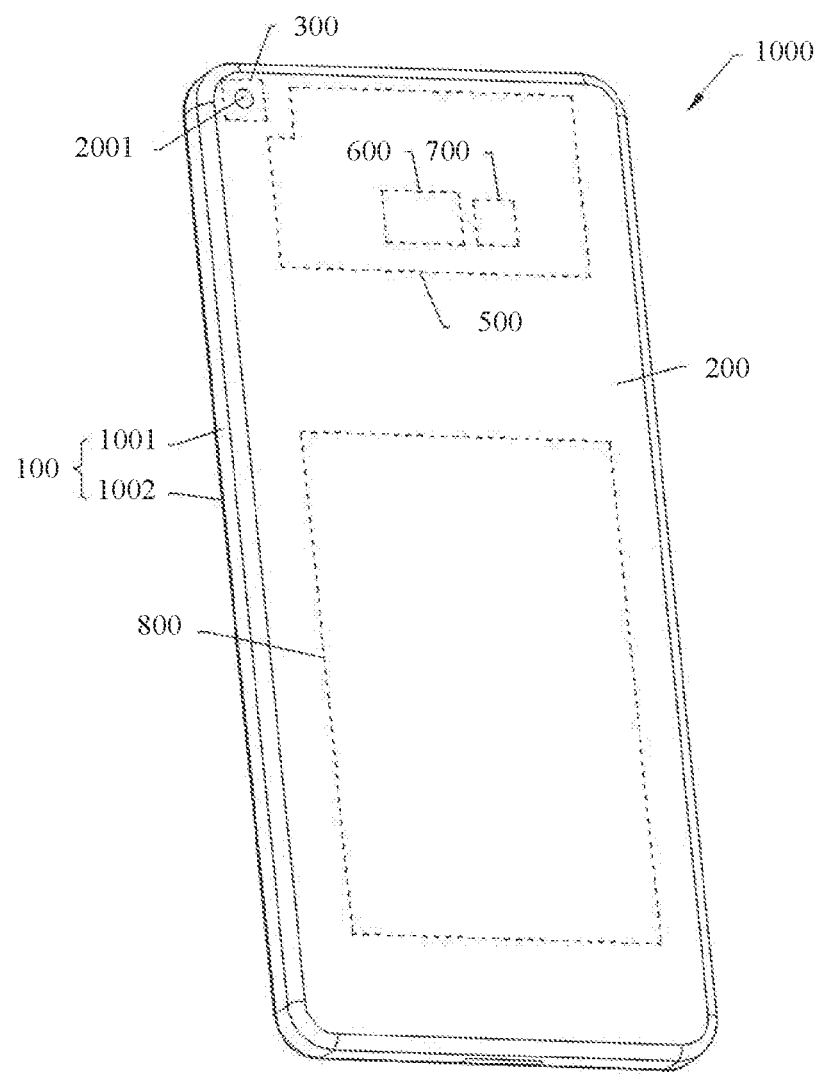
FIG. 1 is a schematic diagram of a structure of an electronic device according to an embodiment of this application.
Figure 2:
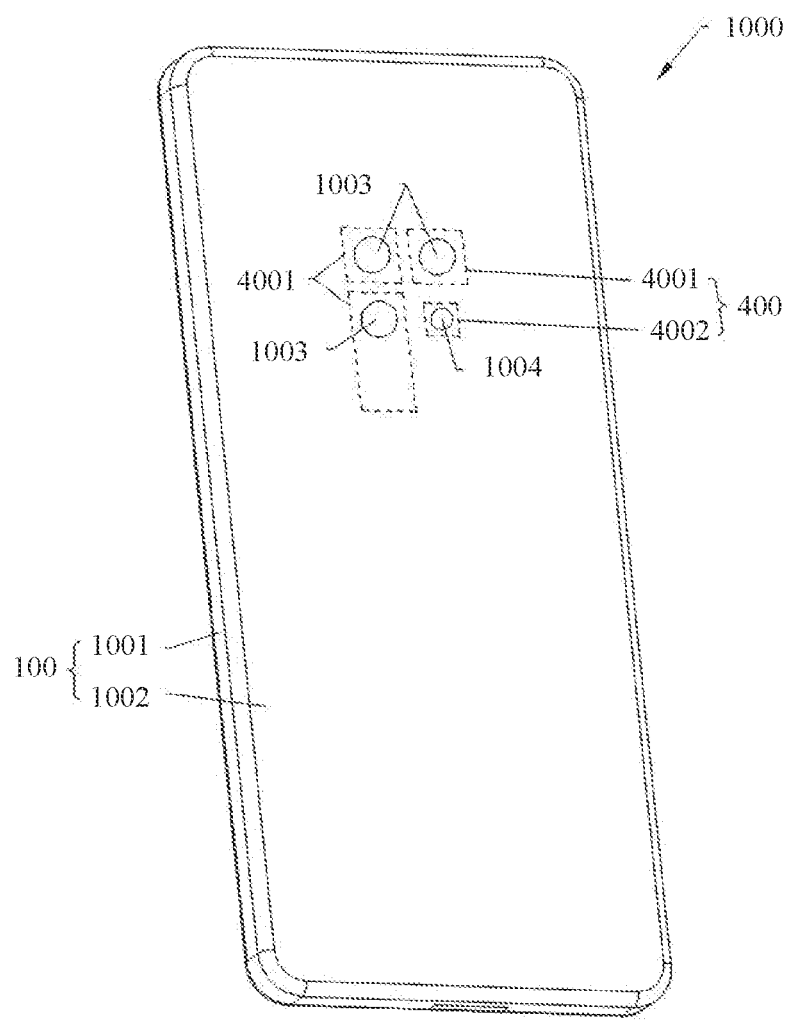
FIG. 2 is a schematic diagram of a structure of the electronic device shown in FIG. 1 from another angle.

Refer to FIG. 1 and FIG. 2 together. FIG. 1 is a schematic diagram of a structure of an electronic device 1000 according to an embodiment of this application, and FIG. 2 is a schematic diagram of a structure of the electronic device 1000 shown in FIG. 1 from another angle. This embodiment is described by using an example in which the electronic device 1000 is a mobile phone.

The electronic device 1000 includes a housing 100, a display screen 200, a front-facing camera assembly 300, a rear-facing camera assembly 400, a mainboard 500, a processor 600, a memory 700, and a battery 800. The display screen 200 is configured to display an image, and the display screen 200 may be further integrated with a touch function. The display screen 200 is mounted on the housing 100. The housing 100 may include a bezel 1001 and a rear cover 1002. The display screen 200 and the rear cover 1002 are respectively mounted on two sides opposite to each other of the bezel 1001. In this embodiment, space facing the display screen 200 is defined as the front of the electronic device 1000, and space facing the rear cover 1002 is defined as the rear of the electronic device 1000.

In some embodiments, the front-facing camera assembly 300 is located in the housing 100 and is located below the display screen 200. The display screen 200 is provided with a light transmitting part 2001, and the front-facing camera assembly 30) collects light from the front of the electronic device 1000 through the light transmitting part 2001, to implement photographing. The front-facing camera assembly 300 may include a camera module described in the following embodiments, or may include a camera module of another structure.

In some embodiments, at least one camera hole 1003 is disposed on the rear cover 1002. The rear-facing camera assembly 400 is located in the housing 100. The rear-facing camera assembly 400 collects light from the rear of the electronic device 1000 through the at least one camera hole 1003, to implement photographing. In embodiments of this application, "at least one" means one or more than one. The rear-facing camera assembly 400 includes at least one camera module 4001, for example, may include one or more of a standard camera module, a long-focus camera module, a wide-angle camera module, an ultra-long-focus camera module or an ultra-wide-angle camera module. For example, the rear-facing camera assembly 400 includes a standard camera, a wide-angle camera, and a periscope long-focus camera. The camera module 4001 of the rear-facing camera assembly 400 may include a camera module described in the following embodiments, or may include a camera module of another structure.

In some embodiments, the rear-facing camera assembly 400 may further include a flash lamp module 4002. The rear cover 1002 is provided with a flash lamp hole 1004. The flash lamp module 4002 is located in the housing 100, and emits light through the flash lamp hole 1004.

In some embodiments, the mainboard 500 is located in the housing 100, and the processor 600 and the memory 700 are fastened to the mainboard 500. The display screen 200, the front-facing camera assembly 300, and the rear-facing camera assembly 400 are coupled to the processor 600. The memory 700 is configured to store computer program code. The computer program code includes computer instructions. The processor 600 is configured to invoke computer instructions to enable the electronic device 1000 to perform a corresponding operation, for example, enable the display screen 200 to display a target image, or enable the camera assembly to collect the target image. The battery 800 is configured to supply power to the electronic device 1000.

In some embodiments, the electronic device 1000 may further include one or more of function modules such as an antenna module, a mobile communication module, a sensor module, a motor, a microphone module or a speaker module. The function module is coupled to the processor 600. The antenna module is configured to transmit and receive an electromagnetic wave signal. The antenna module may include a plurality of antennas, and each antenna may be configured to cover one or more communication frequency bands. Different antennas may be reused to improve utilization of the antennas. The mobile communication module may provide a solution applied to the electronic device 1000 for wireless communication such as 2G/3G/4G/5G. The sensor module may include one or more of a pressure sensor, a gyro sensor, a barometric pressure sensor, a magnetic sensor, an acceleration sensor, a distance sensor, an optical proximity sensor, a fingerprint sensor, a temperature sensor, a touch sensor or an ambient light sensor. The motor may generate a vibration prompt. The motor may be used for an incoming call vibration prompt, or may be used for a touch vibration feedback. The microphone may be configured to convert a sound signal into an electrical signal. The speaker module is configured to convert an electrical signal into a sound signal.

Figure 3:
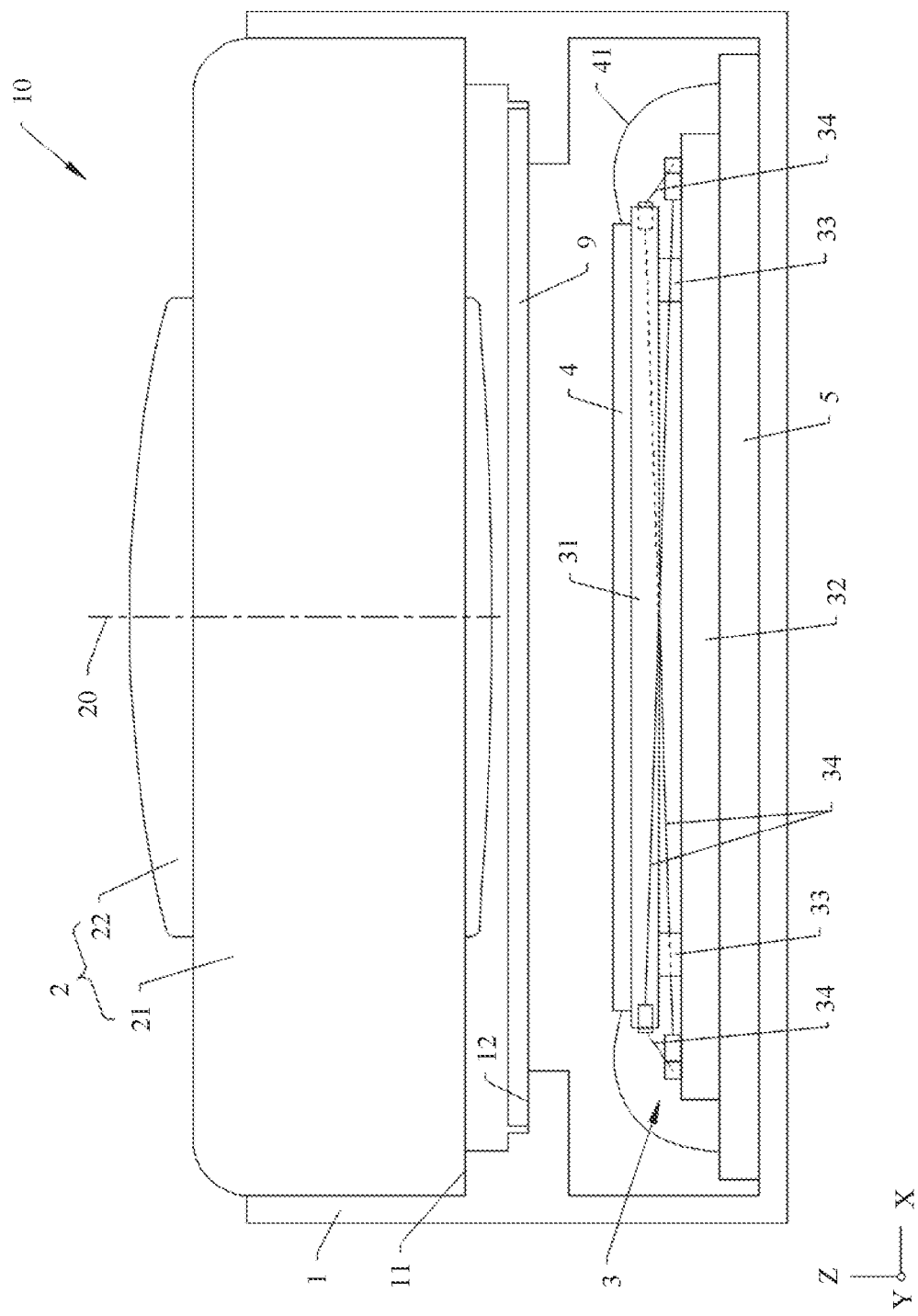
FIG. 3 is a schematic diagram of a structure of an electronic device in a first embodiment according to an embodiment of this application.

FIG. 3 is a schematic diagram of a structure of a camera module 10 in a first embodiment according to an embodiment of this application. For ease of description of the camera module 10 in the following, a width direction of the camera module 10 is defined as a direction X shown in the figure. A length direction of the camera module 10 is defined as a direction Y shown in the figure. A thickness direction of the camera module 10 is defined as a direction Z shown in the figure. The width direction X, the length direction Y, and the thickness direction Z of the camera module 10 are perpendicular to each other.

The camera module 10 includes a module frame 1, a camera lens 2, an SMA motor 3, an image sensor 4, and a circuit board 5.

The module frame 1 is configured to fasten, support, and protect other components of the camera module 10. The module frame 1 includes a first supporting surface 11 and a second supporting surface 12, and the first supporting surface 11 and the second supporting surface 12 are located within the module frame 1. The module frame 1 may be an integrally formed structure, or an integrated structure formed by fastening a plurality of parts in an assembly manner (for example, bonding).

In some embodiments, the camera lens 2 is mounted within the module frame 1. Light enters the camera lens 2 from an in-light side of the camera lens 2, and is emitted from an out-light side of the camera lens 2. The camera lens 2 has a light convergence function. The camera lens 2 includes a lens tube 21 and at least one lens 22 fastened in the lens tube 21. For example, there may be a plurality of lenses 22, and optical axes of the plurality of lenses 22 coincide to form the lenses into a lens group, so as to implement better optical performance. The lens group may include at least one convex lens and at least one concave lens. In some other embodiments, there may alternatively be one lens 22, to simplify a structure of the camera lens 2. In this case, the lens 22 may be a convex lens to converge light. A specific quantity and a combination manner of the lenses 22 are not strictly limited in embodiments of this application. An optical axis 20 of the camera lens 2 is an optical axis of the lens or the lens group. The thickness direction Z of the camera module 10 is parallel to the optical axis 20 of the camera lens 2.

In some embodiments, the camera lens 2 is fastened relative to the module frame 1. The lens tube 21 is fixedly connected to the module frame 1. For example, the lens tube 21 may be disposed to abut against the first supporting surface 11. In this embodiment, the lens tube 21 is fixedly connected to the module frame 1 with a simple connection relationship, so that the structure of the camera module 10 is simplified, costs of the camera module 10 are reduced, and miniaturization of the camera module 10 is implemented.

In some embodiments, the SMA motor 3 is mounted within the module frame 1 and is located on the out-light side of the camera lens 2. In the thickness direction Z of the camera module 10, the SMA motor 3 and the camera lens 2 are stacked with each other at intervals. The image sensor 4 is located between the camera lens 2 and the SMA motor 3 and is fastened to the SMA motor 3. The SMA motor 3 is configured to actuate the image sensor 4 to shift on a plane perpendicular to the optical axis 20 of the camera lens 2. The plane perpendicular to the optical axis 20 of the camera lens 2 of the camera module 10 is an XY plane of the camera module 10, that is, a plane on which the width direction X of the camera module 10 and the length direction Y of the camera module 10 are located.

For example, the image sensor 4 may be fastened to the SMA motor 3 by bonding (for example, by glue dispensing). In another embodiment, the image sensor 4 may alternatively be fastened to the SMA motor 3 in another fastening manner such as soldering or snapping. The image sensor 4 converts an optical image on a light-sensitive surface of the image sensor 4 into an electrical signal in a corresponding proportion to the optical image by using an optical-to-electrical conversion function of an optoelectronic device. The light-sensitive surface of the image sensor 4 is disposed facing the camera lens 2. The image sensor 4 may be a charge coupled device (charge coupled device, CCD), a complementary metal-oxide-semiconductor (complementary metal-oxide-semiconductor, CMOS) photoelectric transistor, or a CMOS thin film transistor (thin film transistor, TFT).

Figure 4A:
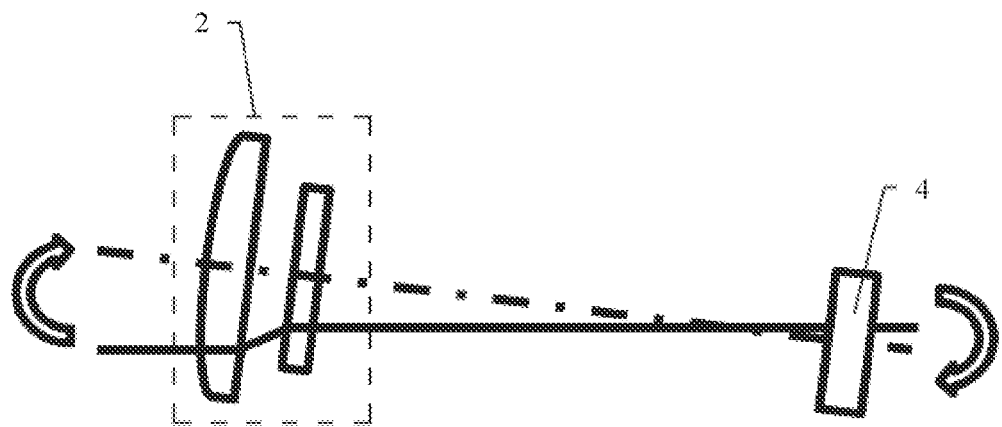
FIG. 4A is a schematic diagram of an initial optical path of the camera module shown in FIG. 3 in a jitter environment.
Figure 4B:
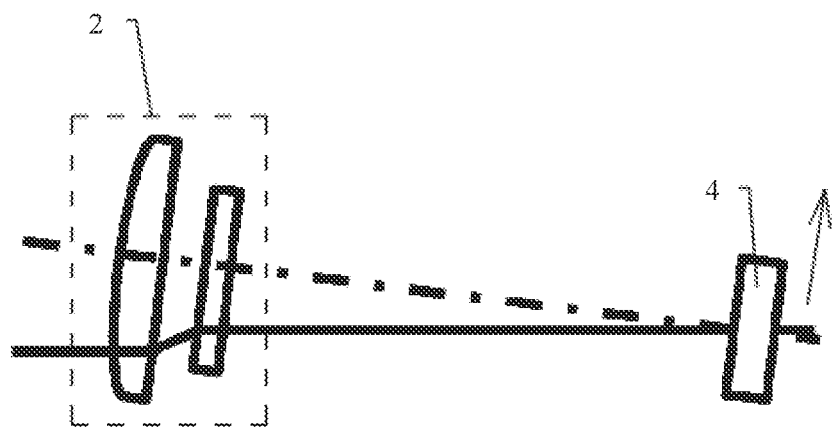
FIG. 4B is a schematic diagram of an optical path when the camera module shown in FIG. 3 implements optical image stabilization.

FIG. 4A is a schematic diagram of an initial optical path of the camera module 10 shown in FIG. 3 in a jitter environment, and FIG. 4B is a schematic diagram of an optical path of the camera module 10 shown in FIG. 3 when optical image stabilization is implemented. FIG. 4A and FIG. 4B each show a structure including a convex lens and a concave lens of the camera lens 2. In FIG. 4A and FIG. 4B, an actual optical path is shown by using a solid line, and an ideal optical path of the image sensor 4 is shown by using a dotted line.

As shown in FIG. 4A, when the camera module 10 jitters, both the camera lens 2 and the image sensor 4 of the camera module 10 tilt relative to incident light. The actual optical path through which the incident light enters the image sensor 4 after passing through the camera lens 2 deviates from the ideal optical path of the image sensor 4. In this way, an imaging region of light on the image sensor 4 deviates from an ideal region. As shown in FIG. 4B, because the SMA motor 3 can actuate the image sensor 4 to shift on a plane perpendicular to an optical axis 20 of the camera lens 2, the SMA motor 3 can actuate the image sensor 4 to shift from an original position in FIG. 4A to an adjusted position in FIG. 4B. In this case, an actual optical path through which incident light enters the image sensor 4 after passing through the camera lens 2 coincides with an adjusted ideal optical path, so that an imaging region is adjusted to an ideal region. Therefore, the camera module 10 can form a high-quality image, thereby implementing image stabilization.

In this embodiment, as weight of the image sensor 4 is greatly reduced compared with that of the camera lens 2, the camera module 10 implements image stabilization by shifting the image sensor 4. In this way, an actuation load of the SMA motor 3 may be reduced to lead to a low power consumption of the SMA motor 3. Consequently, the camera module 10 has a low image stabilization power consumption.

In addition, due to a light convergence effect of the camera lens 2, compared with a conventional solution of shifting a camera lens to perform image stabilization, this embodiment provides the camera module 10 that requires a shorter compensated shift distance to actuate the image sensor 4 to perform optical path compensation via the SMA motor 3. In this way, the power consumption of the SMA motor 3 is further reduced, so that the camera module 10 has a lower image stabilization power consumption. In other words, under a same power consumption, the camera module 10 in this embodiment has better image stabilization performance than the conventional solution.

It may be understood that, in this embodiment, when same image stabilization performance is achieved, how much the compensated shift distance of the image sensor 4 decreases by compared with a compensated shift distance of a conventional camera lens is related to a lens 22 structure of the camera lens 2. An expected compensated shift distance range of the image sensor 4 may be obtained by optimizing a structure of the camera lens 2, so that the camera module 10 has better performance, for example, a lower power consumption, a higher image stabilization feedback speed, and the like.

In this embodiment, because the SMA motor 3 actuates the image sensor 4 to shift on the plane perpendicular to the optical axis 20 of the camera lens 2, the image sensor 4 does not shift relative to the module frame 1 in a direction of the optical axis 20 of the camera lens 2. The camera lens 2 is fastened relative to the module frame 1, so that in the direction of the optical axis 20 of the camera lens 2, a distance between the image sensor 4 and the camera lens 2 remains unchanged. The camera lens 2 is a prime camera lens 2, and the camera module 10 is an image stabilization prime module.

For example, the camera module 10 in this embodiment may be applied to a prime-focus environment, for example, may be used as the camera module 10 of the front-facing camera assembly 300 of the electronic device 1000. This is not strictly limited in this application.

Still refer to FIG. 3. The SMA motor 3 includes an upper motor component 31, a lower motor component 32, a plurality of holds (holds) 33, and four SMA cables 34. The upper motor component 31 and the lower motor component 32 are stacked at intervals in the thickness direction Z of the camera module 10. The image sensor 4 is fastened to the upper motor component 31. The lower motor component 32 is located on a side of the upper motor component 31 away from the image sensor 4. The plurality of holds 33 are located between the lower motor component 32 and the upper motor component 31. One end of each of the plurality of holds 33 that is close to the lower motor component 32 is fixedly connected to the lower motor component 32. One end of each of the plurality of holds 33 that is close to the upper motor component 31 is slidably connected to the upper motor component 31. One end of each of the four SMA cables 34 is fixedly connected to the upper motor component 31, and the other end of the SMA cable 34 is fixedly connected to the motor lower component 32. The SMA cable 34 shrinks when being electrified and heated.

The SMA cable 34 is made of a shape memory alloy (shape memory alloy, SMA) material, for example, a nickel-titanium alloy material. Shape memory alloys are a kind of metals with a shape memory effect. Generally, a metal material first has elastic deformation while being applied with an external force, and may be restored to its original shape after the external force is removed. If the external force continues to be applied, the metal material may have plastic deformation after reaching its yield point, and may not be restored to its original shape even though heated, as the plastic deformation is permanent after the external force is removed. The shape memory alloy is a kind of alloy material which can completely eliminate its deformation at a lower temperature and can be restored to its original shape after being heated. A basic working principle of a shape memory alloy material is to perform shape memory training (training) on the material by heating the material to a critical temperature and deforming the material to a specific extent. After a martensite phase is generated by cooling and then is heated to the critical temperature again, a low-temperature martensite phase is transformed into a high-temperature austenite phase through a reverse phase transformation (that is, a reverse phase change). In this way, the material is restored to what it was before deformation.

In this embodiment, heat generated when the SMA cables 34 are electrified leads to a temperature rise of the SMA cables 34, so that the low-temperature martensite phase is transformed into the high-temperature austenite phase through a reverse phase transformation. The SMA cables are restored to what they were before deformation. In this way, the SMA cables 34 shrink. A length change due to shrinkage of the SMA cables 34 is essentially caused by a transformation between material crystal phase structures, to be specific, the transformation between martensite and austenite. Gravity generated due to a crystal structure change (that is, a gap change between atoms) between microscopic particles makes a pulling force generated when the macro SMA cables 34 shrink much greater than electromagnetic forces between common magnet coils. Therefore, the SMA cables 34 may shrink to actuate a heavier load, that is, may implement a large load. In this way, the SMA motor 3 can implement a large actuation force with a small size.

In this embodiment, the SMA cables 34 may shrink when being electrified and heated, to generate a corresponding pulling force on the upper motor component 31. The camera module 10 may control electrical signals in the four SMA cables 34, so that the four SMA cables apply a combined force to the upper motor component 31 in an expected direction. In this way, the upper motor component 31 together with the image sensor 4 is actuated to shift to an expected position in the expected direction, so that the camera module 10 may implement image stabilization by shifting the image sensor 4.

In addition, compared with a conventional image stabilization motor (that is, a voice coil motor), the SMA motor 3 uses a cable actuation manner instead of a magnetic field actuation manner, so that the structure of the SMA motor 3 is simpler. This simpler structure helps miniaturizing the camera module 10, and may reduce magnetic interference caused by the camera module 10 to an ambient environment.

It may be understood that, as a carrier carrying the image sensor 4, the upper motor component 31 only needs to implement a carrying function and a simple electrical connection relationship. Therefore, compared with a carrier of a conventional image stabilization motor, the upper motor component 31 has a simpler structure, and may be smaller and lighter. In this way, the SMA motor 3 has a small load which leads to a low image stabilization power consumption of the camera module 10.

For example, there are a plurality of manners of fastening the holds 33 and the lower motor component 32, and the manners are determined based on different materials of the holds 33. The holds 33 may be fastened by using an adhesive, or may be fastened in another manner. For example, when the holds 33 are made of a metal material, the holds may be fastened to the lower motor component 32 by bonding. For example, when the holds 33 are made of an organic polymer material such as polyformaldehyde (polyformaldehyde, POM), the holds may be fastened to the lower motor component 32 in a thermal forming bonding manner. In some other embodiments, the holds 33 may alternatively be made of another material, or may be fastened to a lower motor in another fastening manner. This is not strictly limited in embodiments of this application.

As shown in FIG. 3, the circuit board 5 of the camera module 10 is located on a side of the lower motor component 32 away from the upper motor component 31. The circuit board 5 is fixedly connected to the module frame 1. For example, a part of the circuit board 5 is fastened within the module frame 1, and a part (not shown in the figure) of the circuit board extends to the outside of the module frame 1. In another embodiment, the circuit board 5 may alternatively be fixed to the outside of the module frame 1. In this case, one end of the module frame 1 and the SMA motor 3 are fastened on a same side board surface of the circuit board 5, and the SMA motor 3 is located within the module frame 1.

The part that is of the circuit board 5 and that is located outside the module frame 1 may be electrically connected to the mainboard 500 of the electronic device 1000, so that the camera module 10 is coupled to the processor 600. The circuit board 5 is configured to transmit a control signal and an image signal of the camera module 10. For example, an electrical connector is disposed at an end of the circuit board 5 that is configured to connect to the mainboard 500. The electrical connector is connected to an electrical connector on the mainboard 500, so that the camera module 10 is electrically connected to a circuit and a component (for example, the processor 600) on the circuit board 5. The circuit board 5 may be a soft-hard combination circuit board, or may be a flexible circuit board, or may be an integrated circuit board formed by connecting a rigid circuit board and a flexible circuit board. A specific architecture of the circuit board 5 is not limited in this application. The electrical connector on the circuit board 5 may be a board to board (board to board, BTB) connector or the like. In some other embodiments, coupling between the camera module 10, and the circuit and the component on the mainboard 500 may alternatively be implemented in a wireless connection manner.

As shown in FIG. 3, for example, the lower motor component 32 may be directly bonded to the circuit board 5, and the circuit board 5 may be configured to carry and fasten the SMA motor 3, so that the camera module 10 has high structural stability. In some other embodiments, the lower motor component 32 may alternatively be fastened to the circuit board 5 in another manner such as clamping or soldering. A manner of connecting the lower motor component 32 to the circuit board 5 is not strictly limited in embodiments of this application.

As shown in FIG. 3, for example, the image sensor 4 may be electrically connected to the circuit board 5 through a plurality of bonding wires (bonding wire) 41. The bonding wires 41 may be gold wires or the like. Each bonding wire 41 is long. When the image sensor 4 shifts with the upper motor component 31 relative to the lower motor component 32, the image sensor 4 shifts relative to the circuit board 5. The bonding wires 41 are adaptively deformed with a shift of the image sensor 4. The long bonding wires 41 are easier to be deformed and are unlikely to break, so that the bonding wires 41 are highly reliable, and a service life of the camera module 10 is long.

In some other embodiments, the upper motor component 31 forms a circuit, and the lower motor component 32 forms a circuit. Alternatively, the image sensor 4 may be electrically connected to the upper motor component 31, and then conducted to the circuit board 5 through the upper motor component 31 and the lower motor component 32. A circuit of the upper motor component 31 and a circuit of the lower motor component 32 may be formed by electroplating, or by bonding a flexible circuit board, or by embedding metal through insert molding (insert molding). This is not strictly limited in this application.

As shown in FIG. 3, in some embodiments, the camera module 10 may further include an IR cut filter (IR cut filter) 9. The IR cut filter 9 is mounted within the module frame 1 and located between the camera lens 2 and the image sensor 4. In the thickness direction Z of the camera module 10, the IR cut filter 9, the camera lens 2, and the image sensor 4 are stacked with each other at intervals. The IR cut filter 9 is configured to filter infrared light, to improve imaging quality of the camera module 10. For example, the IR cut filter 9 may be made of blue glass (blue glass). For example, the IR cut filter 9 may be disposed to abut against the second supporting surface 12. In some other embodiments, the IR cut filter 9 may alternatively not be disposed in the camera module 10.

Figure 5:
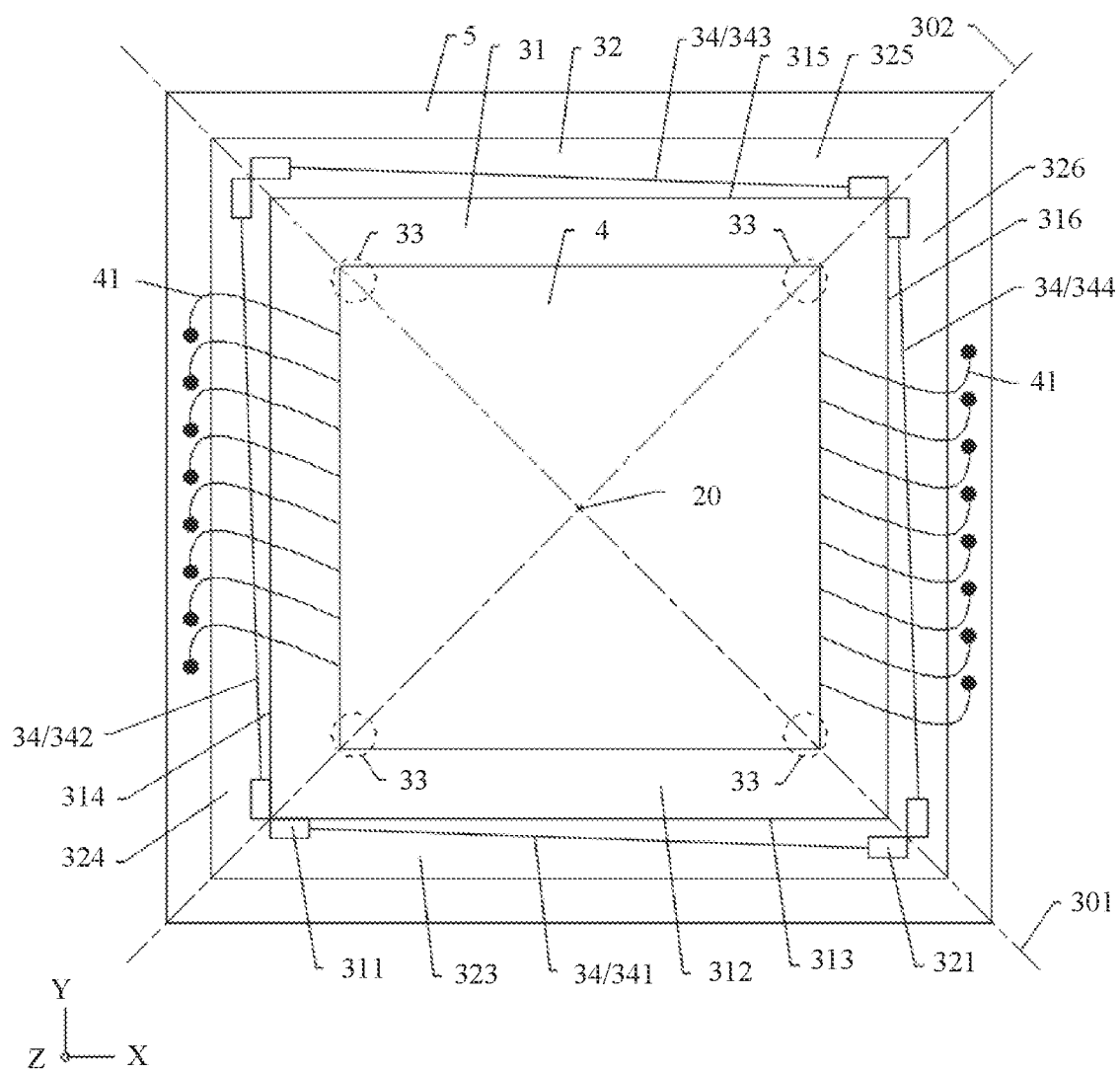
FIG. 5 is a top view of a partial structure of the camera module shown in FIG. 3.

FIG. 5 is a top view of a partial structure of the camera module 10 shown in FIG. 3. FIG. 5 shows the image sensor 4, the SMA motor 3, and the circuit board 5 of the camera module 10.

The SMA motor 3 has a first reference plane 301 and a second reference plane 302. Both the first reference plane 301 and the second reference plane 302 are traversed by the optical axis 20 of the camera lens 2. In this case, the first reference plane 301 intersects with the second reference plane 302. For example, the first reference plane 301 and the second reference plane 302 are perpendicular to each other. The first reference plane 301 rotates clockwise by 45° around the optical axis 20 of the camera lens 2 relative to an XZ plane of the camera module 10. The second reference plane 302 rotates clockwise by 45° around the optical axis 20 of the camera lens 2 relative to a YZ plane of the camera module 10. In another embodiment, an angle between the first reference plane 301 and the second reference plane 302 may alternatively be another angle.

The image sensor 4, the upper motor component 31, the lower motor component 32, and the circuit board 5 are stacked each other in the thickness direction Z of the camera module 10. The image sensor 4 is electrically connected to the circuit board 5 through two groups of symmetrically disposed bonding wires 41. The upper motor component 31 and the lower motor component 32 are traversed by the bonding wires 41. In some other embodiments, there may alternatively be another quantity of groups of the bonding wires 41, for example, four groups. The symmetrically disposed bonding wires 41 help balancing a force applied to the image sensor 4 in a shifting process of the image sensor 4, so that the camera module 10 has better image stabilization performance. A plurality of groups of bonding wires 41 may back up each other. In some other embodiments, there may alternatively be one or three groups of bonding wires 41, or the like.

One end of each SMA cable 34 is fastened to the upper motor component 31, and the other end of the SMA cable is fastened to the lower motor component 32. The four SMA cables 34 are in pairs. The two pairs of SMA cables 34 are symmetrically disposed relative to the first reference plane 301. Two SMA cables 34 of a same pair are symmetrically disposed relative to the second reference plane 302. For example, the four SMA cables 34 include a first SMA cable 341, a second SMA cable 342, a third SMA cable 343, and a fourth SMA cable 344. The first SMA cable 341 and the second SMA cable 342 form a first pair of SMA cables, and the third SMA cable 343 and the fourth SMA cable 344 form a second pair of SMA cables. The first pair of SMA cables and the second pair of SMA cables are symmetrically disposed relative to the first reference plane 301. The first SMA cable 341 and the second SMA cable 342 are symmetrically disposed relative to the second reference plane 302. The third SMA cable 343 and the fourth SMA cable 344 are symmetrically disposed relative to the second reference plane 302.

In this embodiment, a position relationship among the four SMA cables 34 is limited, so that the camera module 10 can control the combined force applied by the four SMA cables 34 to the upper motor component 31 to shift along the first reference plane 301 or shift along the second reference plane 302 by controlling electrical signals in the four SMA cables 34. In addition, a combined shift of the shift on the first reference plane 301 and the shift on the second reference plane 302 enables the upper motor component 31 together with the image sensor 4 to shift to any position in an XY plane (that is, the plane perpendicular to the optical axis 20 of the camera lens 2) of the camera module 10. In this way, the image sensor 4 implements sensor-shift image stabilization.

As shown in FIG. 5, for example, one end of each of the SMA cables 34 may be fastened to the lower motor component 32 through a fixed clamping jaw 321. The other end of the SMA cable 34 may be fastened to the upper motor component 31 through a movable clamping jaw 311. The fixed clamping jaws 321 and the movable clamping jaws 311 may be made of a conductive material or form a conductive structure, so that the SMA cables 34 are electrically connected to the upper motor component 31 and the lower motor component 32.

It can be understood that, the four SMA cables 34 of the camera module 10 may have a plurality of specific connection manners if the foregoing position relationship requirements are met. This embodiment takes one of the connection manners as an example for description.

For example, the upper motor component 31 is approximately shaped as a rectangular plate. The upper motor component 31 includes an upper plate surface 312 facing the image sensor 4 and peripheral sides connected to peripheral edges of the upper plate surface 312. The image sensor 4 is fastened on the upper plate surface 312 of the upper motor component 31. The peripheral sides include a first side 313, a second side 314, a third side 315, and a fourth side 316 that are connected in sequence. The first side 313 and the second side 314 are symmetrically disposed relative to the second reference plane 302. The third side 315 and the second side 314 are symmetrically disposed relative to the first reference plane 301. The fourth side 316 and the third side 315 are symmetrically disposed relative to the second reference plane 302. The first side 313 and the fourth side 316 are symmetrically disposed relative to the first reference plane 301.

In some other embodiments, the upper motor component 31 may alternatively have another shape, for example, a rounded rectangular plate shape or a circular plate shape. It may be understood that each side of the peripheral sides of the upper motor component 31 adaptively changes with a shape of the upper motor component 31.

Figure 6:
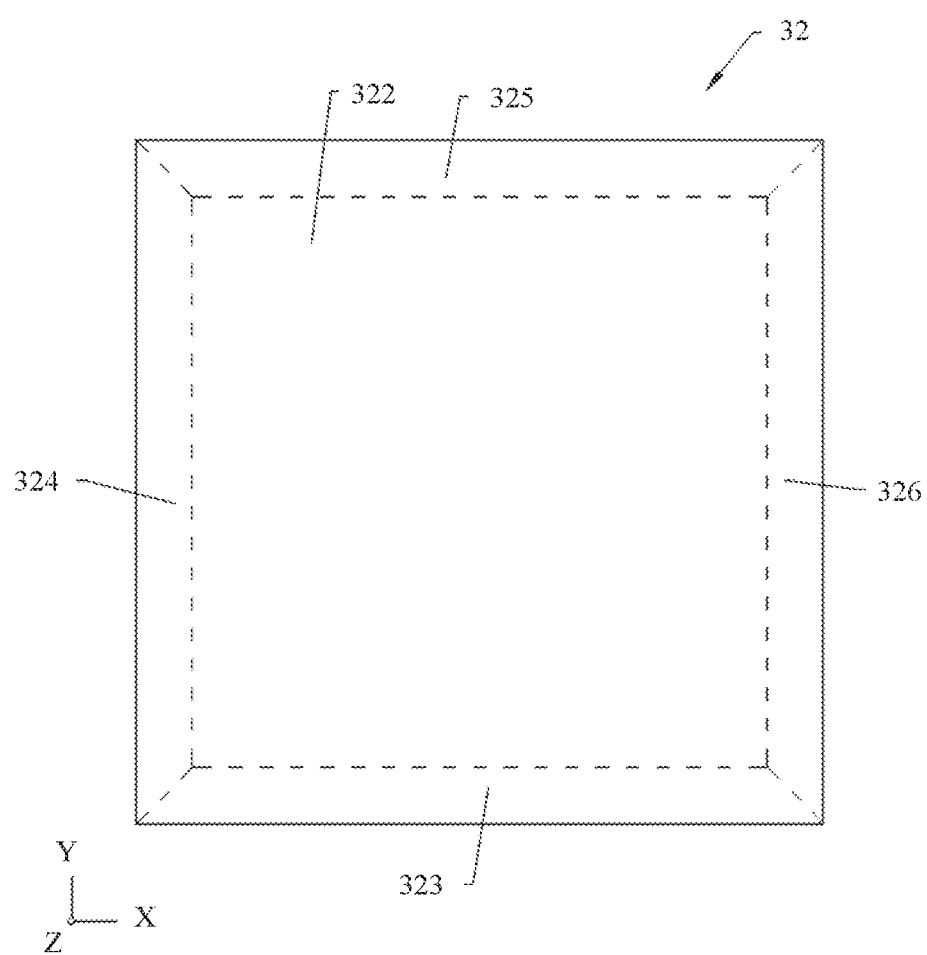
FIG. 6 is a top view of the lower motor component shown in FIG. 5.

Refer to FIG. 5 and FIG. 6 together. FIG. 6 is a top view of the lower motor component 32 shown in FIG. 5.

For example, the lower motor component 32 includes a middle region 322 facing the upper motor component 31 and edge regions disposed around the middle region 322. The plurality of holds 33 are fastened in the middle region 322. In this case, the plurality of holds 33 support the upper motor component 31 more stably. For example, there are four holds 33. The four holds 33 are respectively supported at four diagonal corners of the upper motor component 31. The four holds 33 may be respectively located on the first reference plane 301 and the second reference plane 302 in pairs. A specific distance is formed between the plurality of holds 33 and edges of the upper motor component 31, so that when the upper motor component 31 shifts, the plurality of holds 33 can keep in contact with the upper motor component 31 to support the upper motor component 31.

The edge regions of the lower motor component 32 include a first edge region 323, a second edge region 324, a third edge region 325, and a fourth edge region 326. The first edge region 323 and the first side 313 are disposed in a corresponding manner. The second edge region 324 and the second side 314 are disposed in a corresponding manner. The third edge region 325 and the third side 315 are disposed in a corresponding manner. The fourth edge region 326 and the fourth side 316 are disposed in a corresponding manner. The first edge region 323 and the fourth edge region 326 are symmetrically disposed relative to the first reference plane 301. The third edge region 325 and the second edge region 324 are symmetrically disposed relative to the first reference plane 301. The fourth edge region 326 and the third edge region 325 are symmetrically disposed relative to the second reference plane 302. The first edge region 323 and the fourth edge region 326 are symmetrically disposed relative to the first reference plane 301.

It may be understood that, in this embodiment, the lower motor component 32 is approximately shaped as a rectangular plate. In some other embodiments, the shape of the lower motor component 32 may alternatively change adaptively with the shape of the upper motor component 31. In some other embodiments, the shape of the lower motor component 32 may alternatively be different from the shape of the upper motor component 31. This is not strictly limited in this application.

It may be understood that, in this embodiment, the first edge region 323, the second edge region 324, the third edge region 325, and the fourth edge region 326 are sequentially connected to form continuous edge regions. In another embodiment, the first edge region 323, the second edge region 324, the third edge region 325, and the fourth edge region 326 may alternatively be disposed with each other at intervals, or may be partially spaced and partially continuous. This is not strictly limited in this application.

As shown in FIG. 5, one end of the first SMA cable 341 is fastened to an end of the first side 313 of the upper motor component 31 close to the second side 314. The other end of the first SMA cable 341 is fastened to one end of the first edge region 323 of the lower motor component 32 close to the fourth edge region 326. The second SMA cable 342 and the first SMA cable 341 are symmetrically disposed relative to the second reference plane 302. One end of the second SMA cable 342 is fastened to one end of the second side 314 of the upper motor component 31 close to the first side 313. The other end of the second SMA cable 342 is fastened to one end of the second edge region 324 of the lower motor component 32 close to the third edge region 325. The third SMA cable 343 and the second SMA cable 342 are symmetrically disposed relative to the first reference plane 301. One end of the third SMA cable 343 is fastened to one end of the third side 315 of the upper motor component 31 close to the fourth side 316. The other end of the third SMA cable 343 is fastened to one end of the third edge region 325 of the lower motor component 32 close to the second edge region 324. The fourth SMA cable 344 and the third SMA cable 343 are symmetrically disposed relative to the second reference plane 302. One end of the fourth SMA cable 344 is fastened to one end of the fourth side 316 of the upper motor component 31 close to the third side 315. The other end of the fourth SMA cable 344 is fastened to one end of the fourth edge region 326 of the lower motor component 32 close to the first edge region 323.

In this embodiment, one end of each of the SMA cables 34 is fastened at a diagonal position of the upper motor component 31. The other end is fastened at a diagonal position of the lower motor component 32, so that the SMA cable 34 can have a sufficient length when space in the SMA motor 3 is limited. In this way, the SMA cable has a sufficient amount of expansion, so that the SMA motor 3 may have a larger actuation stroke range to lead to a better image stabilization performance of the camera module 10.

In some other embodiments, one end of the first SMA cable 341 may alternatively be fastened to one end of the first side 313 of the upper motor component 31 close to the fourth side 316. The other end of the first SMA cable 341 is fastened to one end of the first edge region 323 of the motor lower part 32 close to the second edge region 324. The second SMA cable 342, the third SMA cable 343, and the fourth SMA cable 344 adaptively change as a position of the first SMA cable 341 changes.

It may be understood that, in some embodiments, extension directions of the four SMA cables 34 are respectively parallel to the four sides of the upper motor component 31, so that the four SMA cables 34 actuate the upper motor component 31 to shift. In FIG. 5, to conveniently show structures and position differences of the plurality of SMA cables 34, the SMA cables 34 are drawn in a tilting manner. In addition, in the thickness direction Z of the camera module 10, heights of the four SMA cables 34 are consistent.

To be specific, fixed ends of the SMA cables connected to the upper motor component 31 and movable ends of the SMA cables connected to the lower motor component 32 are consistent in height, so that the four SMA cables 34 actuate the upper motor component 31 to shift conveniently. In FIG. 3, to conveniently show structures and position differences of the plurality of SMA cables 34, the SMA cables 34 are drawn in a tilting manner. For example, clamping jaw (for example, the fixed clamping jaws 321 and the movable clamping jaws 311 in FIG. 5) structures used to fasten the SMA cables 34 may be designed, so that positions of the SMA cables 34 meet requirements. For example, the movable clamping claws 311 in FIG. 5 may be large in size, or may be designed into small boss structures, so that the first SMA cable 341 is parallel to the first side 313 of the upper motor component 31. Certainly, in another embodiment, the clamping jaw may alternatively have another implementation structure. This is not strictly limited in this application.

Figure 7:
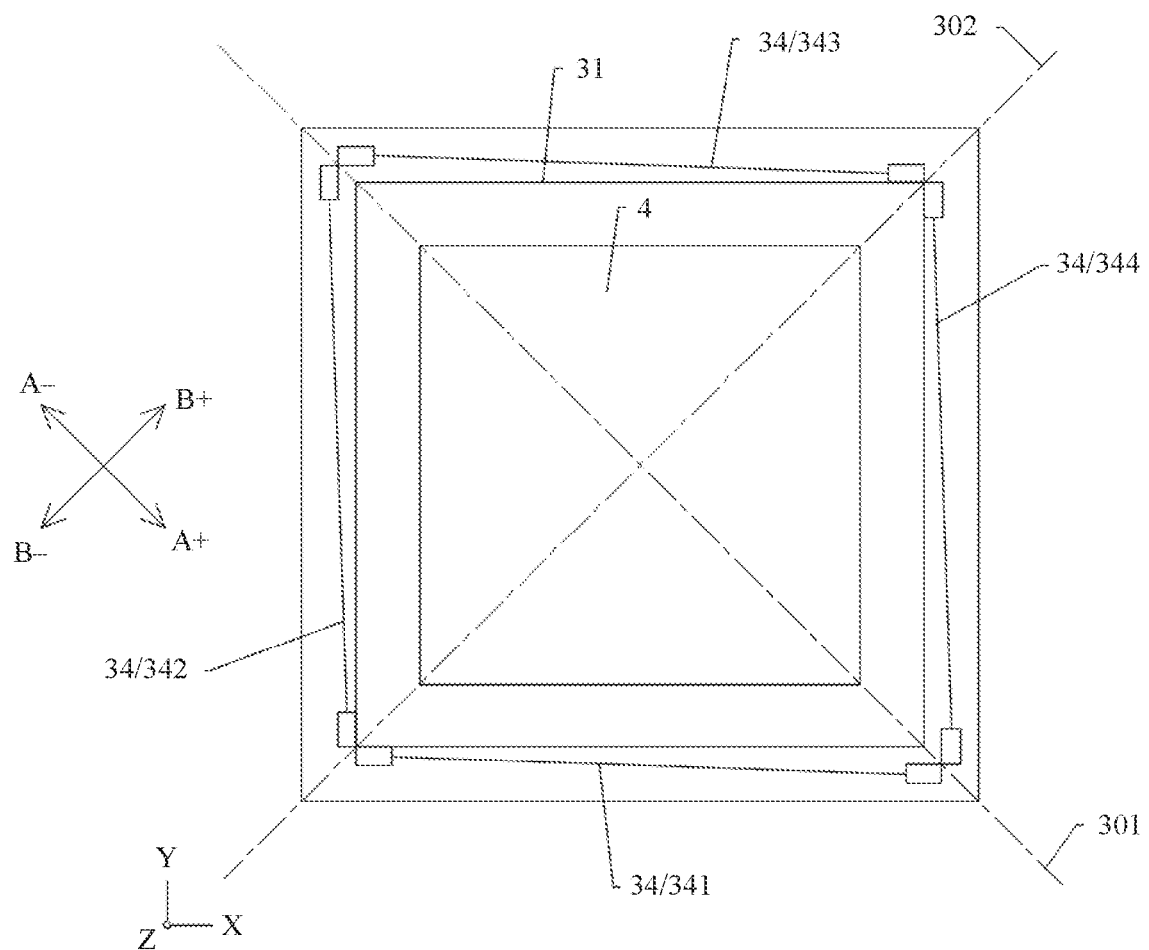
FIG. 7 is a schematic diagram of a structure in which the SMA motor shown in FIG. 5 actuates an image sensor to shift.

FIG. 7 is a schematic diagram of a structure in which the SMA motor 3 shown in FIG. 5 actuates the image sensor 4 to shift. A process in which the SMA motor 3 actuates the image sensor 4 to shift is described below as an example with reference to FIG. 7.

It is shown that two directions of the first reference plane 301 away from the second reference plane 302 are respectively an A+ direction and an A− direction. Two directions of the second reference plane 302 away from the first reference plane 301 are respectively a B+ direction and a B− direction.

The four SMA cables 34 are all electrified. The first SMA cable 341 generates a pulling force F1. The second SMA cable 342 generates a pulling force F2. The third SMA cable 343 generates a pulling force F3. The fourth SMA cable 344 generates a pulling force F4. When F1+F4>F2+F3, the upper motor component 31 together with the image sensor 4 shifts in the A+ direction. When F1+F4<F2+F3, the upper motor component 31 together with the image sensor 4 shifts in the A− direction. When F1+F2>F3+F4, the upper motor component 31 together with the image sensor 4 shifts in the B− direction. When F1+F2<F3+F4, the upper motor component 31 together with the image sensor 4 shifts in the B+ direction. When acting forces of the four SMA cables 34 are balanced, the upper motor component 31 and the image sensor 4 are in a stable state.

Figure 8:
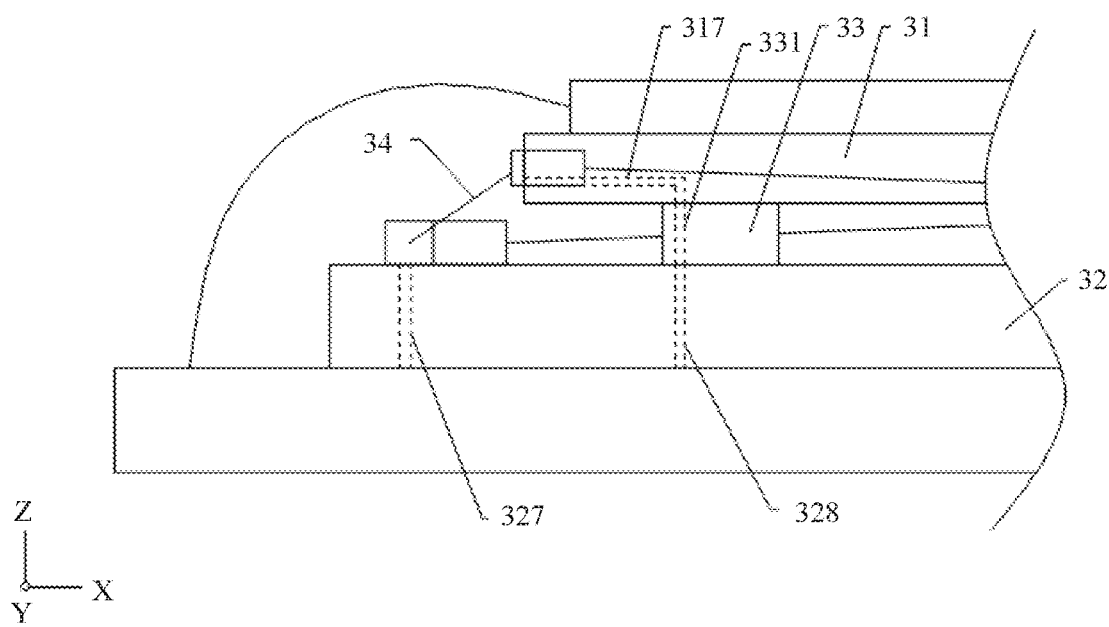
FIG. 8 is a schematic diagram of a partial structure of the camera module shown in FIG. 3.

FIG. 8 is a schematic diagram of a partial structure of the camera module 10 shown in FIG. 3.

A first electric-conductor 317 is disposed on the upper motor component 31, a second electric-conductor 331 is disposed on the hold 33, and a third electric-conductor 327 and a fourth electric-conductor 328 are disposed on the lower motor component 32. The third electric-conductor 327 electrically connects the circuit board 5 to one end of the SMA cable 34, the other end of the SMA cable 34 is electrically connected to the first electric-conductor 317. The first electric-conductor 317 is electrically connected to the fourth electric-conductor 328 through the second electric-conductor 331. The fourth electric-conductor 328 is electrically connected to the circuit board 5.

In this embodiment, the circuit board 5, the third electric-conductor 327, the SMA cable 34, the first electric-conductor 317, the second electric-conductor 331, and the fourth electric-conductor 328 form a loop. The circuit board 5 can supply power to the SMA cable 34, so as to control a shrinkage status of the SMA cable 34 through an electrical signal.

It may be noted that, the camera module 10 inputs different electrical signals into different SMA cables 34, so that the different SMA cables 34 can shrink independently of each other. In some embodiments, channels corresponding to the different SMA cables 34 are independent of each other. For example, there are four first electric-conductors 317, four second electric-conductors 331, four third electric-conductors 327 and four fourth electric-conductors 328. One third electric-conductor 327, one SMA cable 34, one first electric-conductor 317, one second electric-conductor 331 and one fourth electric-conductor 328 form one channel. The SMA motor 3 forms four channels independent of each other. In some other embodiments, the channels corresponding to the different SMA cables 34 are partially shared, to simplify a circuit structure. For example, there are four third electric-conductors 327, one first electric-conductor 317, one second electric-conductor 331, and one fourth electric-conductor 328. The four third electric-conductors 327 are respectively connected to one end of each of the four SMA cables 34, and the other ends of the four SMA cables 34 are all connected to the first electric-conductor 317. The second electric-conductor 331 is connected to the first electric-conductor 317 and the fourth electric-conductor 328. In this embodiment, channels of different SMA cables 34 have different positive inputs and a same negative output, and the channels of the different SMA cables 34 may still input different electrical signals.

The first electric-conductor 317, the second electric-conductor 331, the third electric-conductor 327, and the fourth electric-conductor 328 each may have a plurality of implementation structures, including but are not limited to a conducting wire, a conductive patch, a conductive mechanical part, or the like. For example, the first electric-conductor 317 may be a part of a circuit of the upper motor component 31. The third electric-conductor 327 and the fourth electric-conductor 328 each may be a part of a circuit of the lower motor component 32. The second electric-conductor 331 may be formed by electroplating, or may be formed by bonding a flexible circuit board, or may be formed by embedding metal through insert molding (insert molding). This is not strictly limited in this application.

Figure 9:
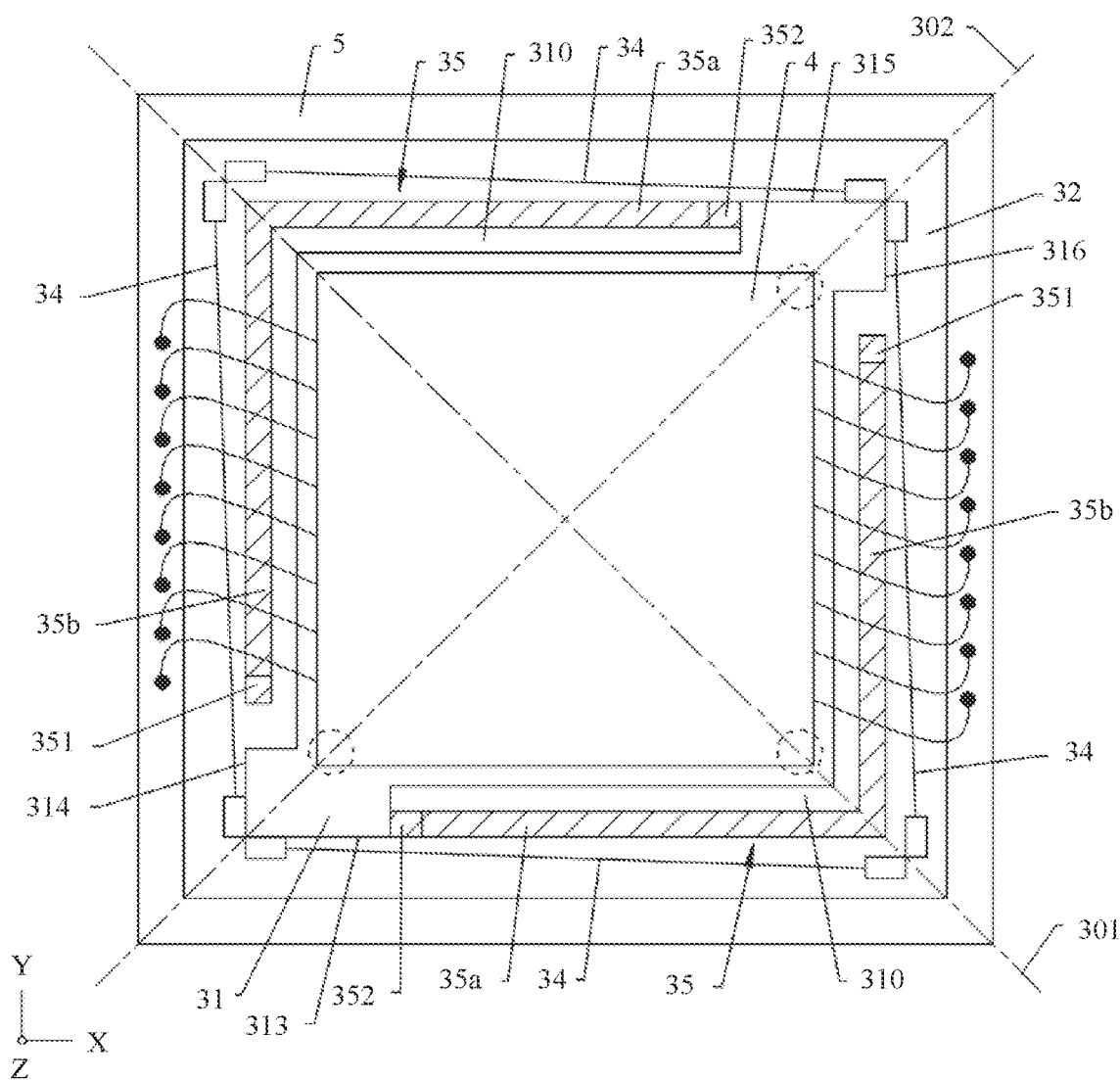
FIG. 9 is a top view of a partial structure of the camera module shown in FIG. 3 in some other embodiments.
Figure 10:
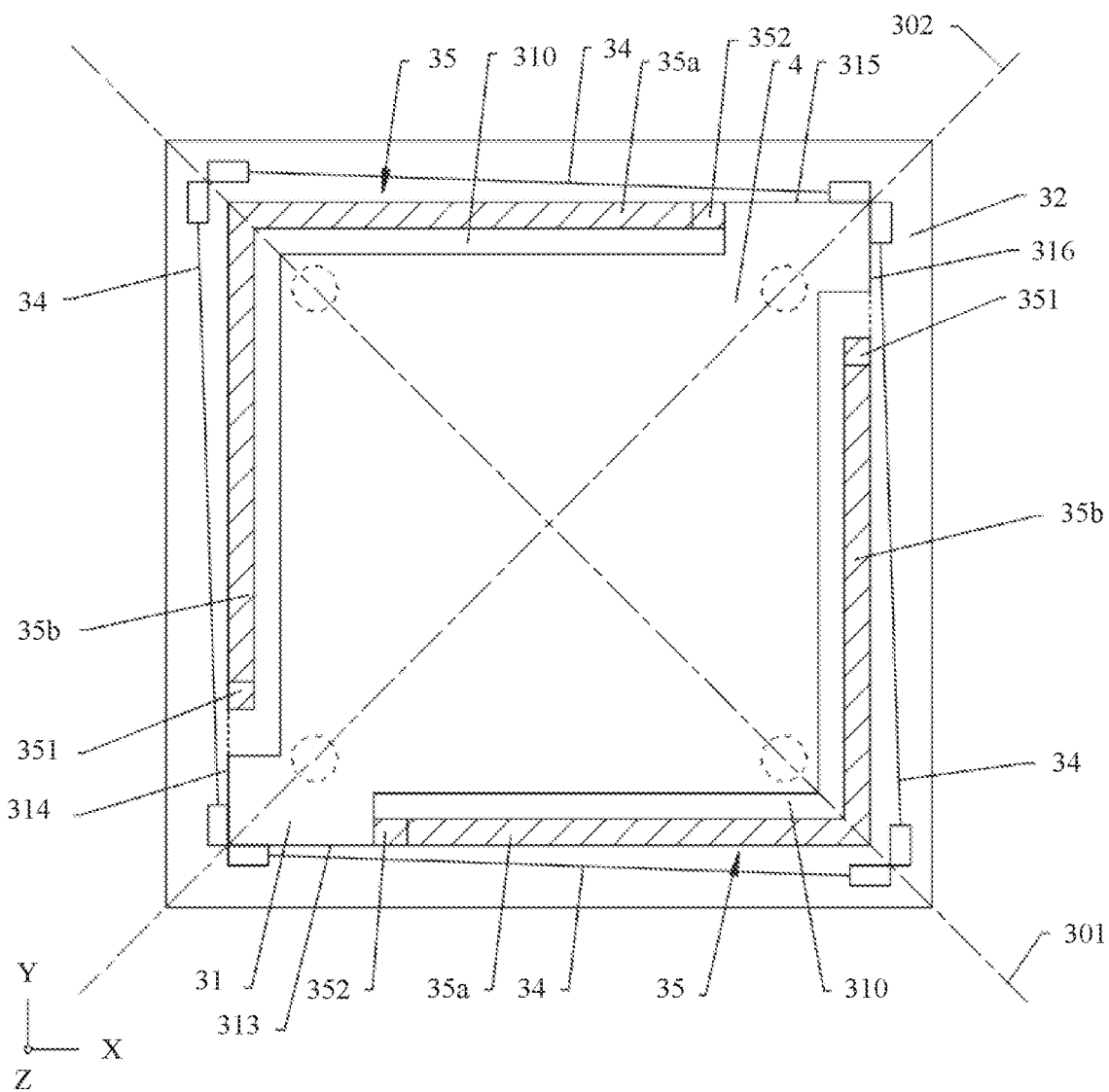
FIG. 10 is a schematic diagram of a structure of the SMA motor shown in FIG. 9.

Refer to FIG. 9 and FIG. 10 together. FIG. 9 is a top view of a partial structure of the camera module 10 shown in FIG. 3 in some other embodiments, and FIG. 10 is a schematic diagram of a structure of the SMA motor 3 shown in FIG. 9. FIG. 9 shows the image sensor 4, the SMA motor 3, and the circuit board 5 of the camera module 10. The following mainly describes differences between this embodiment and the foregoing embodiments, and most content of this embodiment that is the same as the content of the foregoing embodiments is not described again.

In some embodiments, the SMA motor 3 may further include two spring arms 35 (spring arms). Hatching is performed on structures of the spring arms 35 to highlight the spring arms 35 in FIG. 9 and FIG. 10. The spring arms 35 each are L-shaped. Each of the spring arms 35 includes a fixed end 351 and a movable end 352. The movable ends 352 of the spring arms 35 are fastened to the upper motor component 31. The fixed ends 351 of the spring arms 35 are fastened to the lower motor component 32, for example, may be fastened to the middle region 322 of the lower motor component 32. The two spring arms 35 are disposed in a centrosymmetric manner, and a symmetric center of the two spring arms is an intersection line of the first reference plane 301 and the second reference plane 302. When the upper motor component 31 shifts, the two centrosymmetric spring arms 35 are deformed to a same extent.

In this embodiment, by the disposition of the spring arms 35, the SMA motor 3 can balance and buffer a force applied to the upper motor component 31 when the SMA cables 34 are electrified to actuate the upper motor component 31 to shift together with the image sensor 4. This makes the upper motor component 31 shift more stably. In addition, when the SMA cables 34 are powered off, the SMA motor can also actuate the upper motor component 31 together with the image sensor 4 to shift back to an initial position by using an elastic force generated by deformation of the spring arms 35 when the SMA cables 34 are electrified to actuate the upper motor component 31 to shift.

In addition, the fixed ends 351 of the spring arms 35 are fastened to the middle region 322 of the lower motor component 32, so that activity space of the spring arms 35 does not overlap with activity space of the SMA cables 34. This may avoid interference between the spring arms 35 and the SMA cables 34 in a shifting process of the upper motor component 31.

In some other embodiments, the fixed ends 351 of the spring arms 35 may alternatively be fastened to a peripheral region of the lower motor component 32. Positions for fastening the fixed ends 351 of the spring arms 35 are not strictly limited in this application.

For example, the two spring arms 35 may be integrally formed on the upper motor component 31, to simplify an assembly structure of the SMA motor 3. In this way, the SMA motor 3 has better structural stability. In another embodiment, the movable ends 352 of the spring arms 35 may alternatively be fastened to the upper motor component 31 by soldering or the like. This is not strictly limited in this application. The fixed ends 351 of the spring arms 35 may be fastened to the lower motor component 32 by soldering or the like. This is not strictly limited in this application.

As shown in FIG. 10, for example, each of the spring arms 35 includes a first branch 35a and a second branch 35b connected to the first branch 35a One end of the first branch 35a away from the second branch 35b is a movable end 352 fixedly connected to the upper motor component 31. One end of the second branch 35b away from the first branch 35a is a movable end 351 fixedly connected to the lower motor component 32. A first branch 35a of one 35 of the two spring arms 35 is parallel to the first side 313, and a second branch 35b of one of the two spring arms is parallel to the fourth side 316. A first branch 35a of the other one 35 of the two spring arms 35 is parallel to the third side 315. A second branch 35b of the other one of the two spring arms is parallel to the second side 314. In this embodiment, shapes and positions of the two spring arms 35 adapt to the upper motor component 31, so that the two spring arms 35 have a better balance and buffer effect on the upper motor component 31.

As shown in FIG. 10, in some embodiments, peripheral sides of the upper motor component 31 are partially recessed to form two L-shaped avoidance grooves 310. Each avoidance groove 310 extends from one side of the upper motor component 31 to another side of the upper motor component. The two spring arms 35 are respectively disposed corresponding to the two avoidance grooves 310. The movable ends 352 of the spring arms 35 are fastened to side walls of the avoidance grooves 310, and the side walls of the avoidance grooves 310 are connected to the peripheral sides of the upper motor component 31.

In this embodiment, for the SMA motor 3, the avoidance grooves 310 of the upper motor component 31 and space below the avoidance grooves 310 are used as mounting space and activity space of the spring arms 35, so that the spring arms 35 and the upper motor component 31 are disposed more compactly. In this way, the SMA motor 3 is easier to be miniaturized.

In some other embodiments, the movable ends 352 of the spring arms 35 may alternatively be fastened to a plate surface of the upper motor component 31 facing the lower motor component 32. In this case, no avoidance groove 310 may be disposed on the upper motor component 31, so that the upper motor component 31 has a complete structure, and is easier to process.

Figure 11:
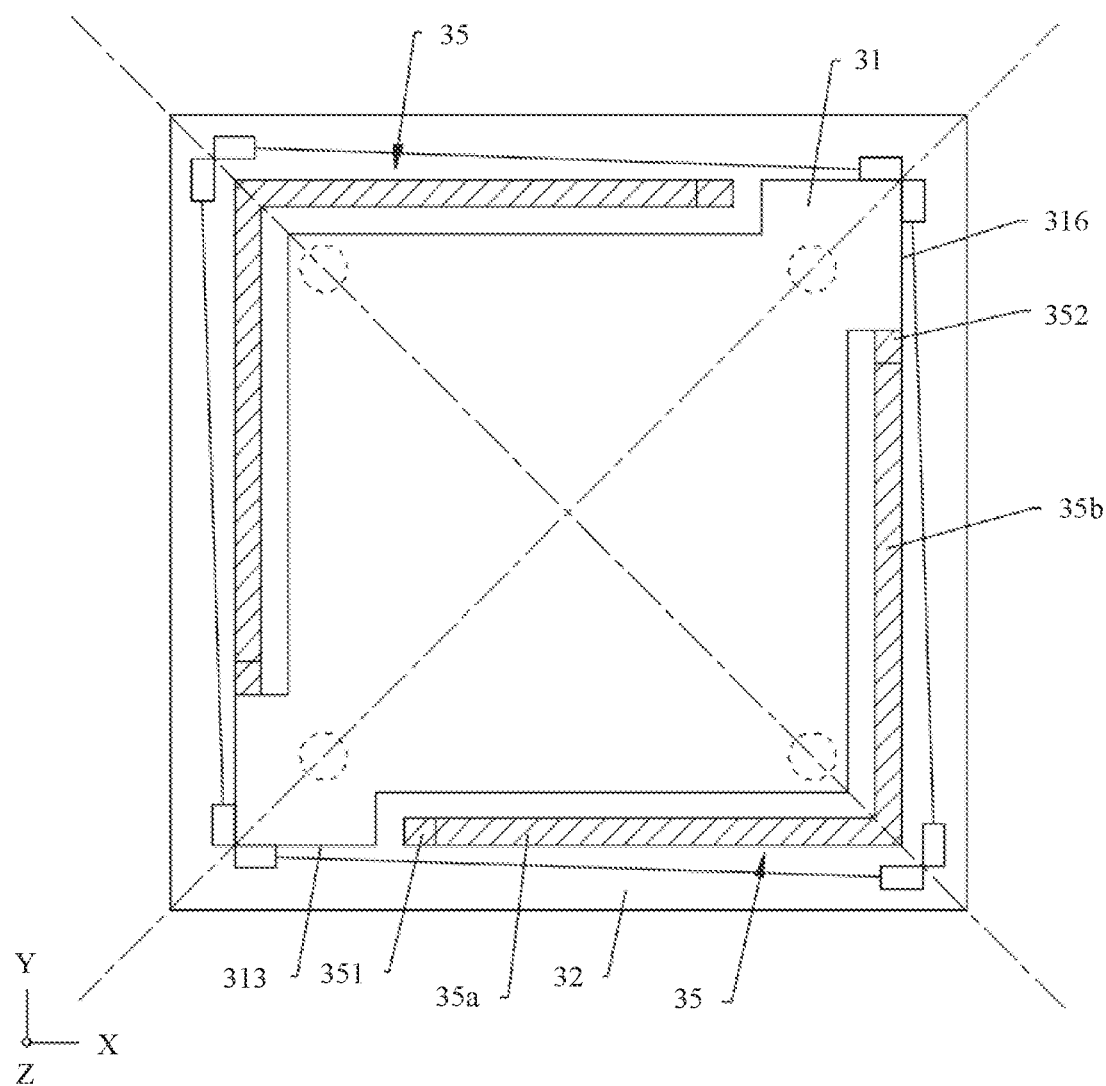
FIG. 11 is a schematic diagram of a structure of the SMA motor shown in FIG. 9 in some other embodiments.

FIG. 11 is a schematic diagram of a structure of the SMA motor 3 shown in FIG. 9 in some other embodiments. The following mainly describes differences between this embodiment and the foregoing embodiments, and most content of this embodiment that is the same as the content of the foregoing embodiments is not described again. Hatching is performed on structures of the spring arms 35 to highlight the spring arms 35 in FIG. 1.

In this embodiment, a first branch 35a of one 35 of the two spring arms 35 is parallel to the first side 313. A second branch 35b of one of the two spring arms is parallel to the fourth side 316. One end of the first branch 35a of the spring arm 35 away from the second branch 35b is a fixed end 351 fixedly connected to the lower motor component 32. One end of the second branch 35b away from the first branch 35a is a movable end 352 fixedly connected to the upper motor component 31.

Figure 12:
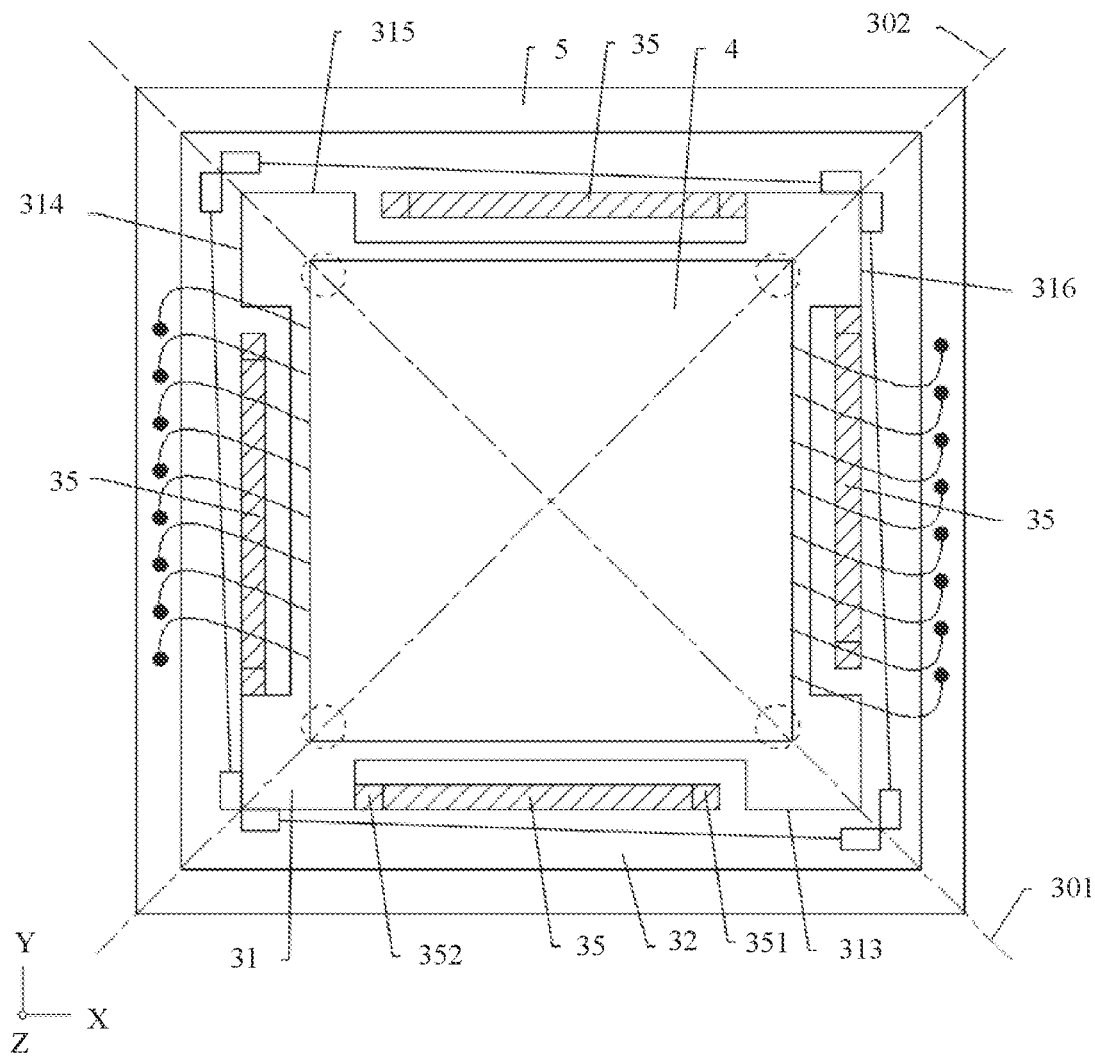
FIG. 12 is a top view of a partial structure of the camera module shown in FIG. 3 in still some other embodiments.
Figure 13:
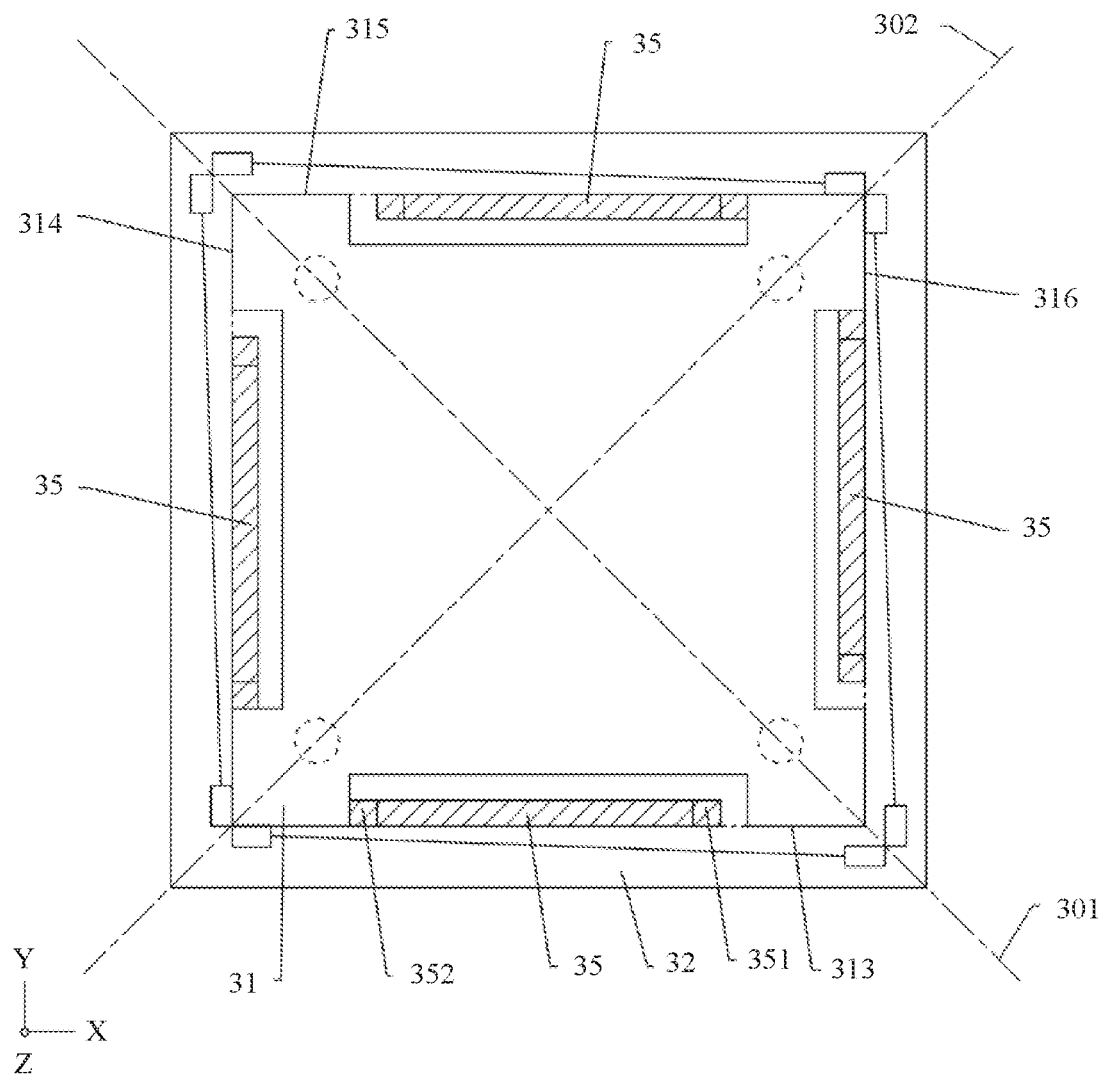
FIG. 13 is a schematic diagram of a structure of the SMA motor shown in FIG. 12.

Refer to FIG. 12 and FIG. 13 together. FIG. 12 is a top view of a partial structure of the camera module 10 shown in FIG. 3 in still some other embodiments, and FIG. 13 is a schematic diagram of a structure of the SMA motor 3 shown in FIG. 12. FIG. 12 shows the image sensor 4, the SMA motor 3, and the circuit board 5 of the camera module 10. The following mainly describes differences between this embodiment and the foregoing embodiments, and most content of this embodiment that is the same as the content of the foregoing embodiments is not described again.

In some embodiments, the SMA motor 3 further includes four spring arms 35. For example, the spring arms 35 each are shaped as a long strip. Each of the spring arms 35 includes a fixed end 351 and a movable end 352. The movable ends 352 of the spring arms 35 are fastened to the upper motor component 31. The fixed ends 351 of the spring arms 35 are fastened to the lower motor component 32, for example, may be fastened to the middle region 322 of the lower motor component 32. The four spring arms 35 are in pairs. The two pairs of spring arms 35 are symmetrically disposed relative to the first reference plane 301. Two spring arms 35 of a same pair are symmetrically disposed relative to the second reference plane 302.

In this embodiment, by the disposition of the spring arms 35, the SMA motor 3 can balance and buffer a force applied to the upper motor component 31 when the SMA cables 34 are electrified to actuate the upper motor component 31 to shift together with the image sensor 4. This makes the upper motor component 31 shift more stably. In addition, when the SMA cables 34 are powered off, the SMA motor can also actuate the upper motor component 31 together with the image sensor 4 to shift back to an initial position by using an elastic force generated by deformation of the spring arms 35 when the SMA cables 34 are electrified to actuate the upper motor component 31 to shift. In addition, a disposition relationship of the four spring arms 35 corresponds to a disposition relationship of the SMA cables 34. Therefore, the four spring arms 35 may better implement a balance function and a restoration function.

In addition, the fixed ends 351 of the spring arms 35 are fastened to the middle region 322 of the lower motor component 32, so that activity space of the spring arms 35 does not overlap with activity space of the SMA cables 34.

This may avoid interference between the spring arms 35 and the SMA cables 34 in a shifting process of the upper motor component 31.

For example, the four spring arms 35 may be respectively parallel to the four sides (313, 314, 315, and 316) of the upper motor component 31.

Figure 14:
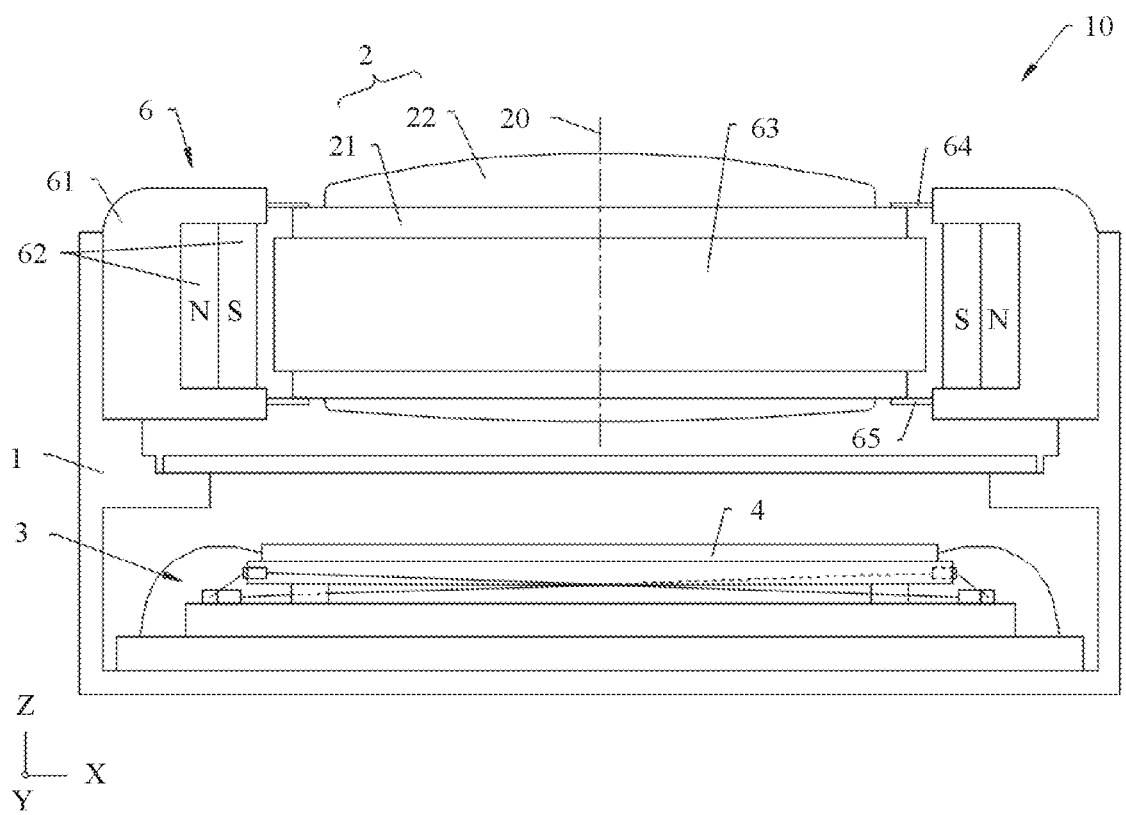
FIG. 14 is a schematic diagram of a structure of a camera module in a second embodiment according to an embodiment of this application.

FIG. 14 is a schematic diagram of a structure of a camera module 10 in a second embodiment according to an embodiment of this application. The following mainly describes differences between this embodiment and the foregoing embodiments, and most content of this embodiment that is the same as the content of the foregoing embodiments is not described again.

In some embodiments, the camera module 10 may further include a voice coil motor 6. The voice coil motor 6 is fastened within the module frame 1. The camera lens 2 is mounted on the voice coil motor 6. The voice coil motor 6 is configured to actuate the camera lens 2 to shift in the direction parallel to the optical axis 20 of the camera lens 2.

In this embodiment, the camera module 10 may actuate, through the SMA motor 3, the image sensor 4 to shift on the plane perpendicular to the optical axis 20 of the camera lens 2, so that a position of the image sensor 4 relative to the camera lens 2 changes, to implement image stabilization. The camera module 10 may further actuate, through the voice coil motor 6, the camera lens 2 to shift, so that a distance between the camera lens 2 and the image sensor 4 in the direction parallel to the optical axis 20 of the camera lens 2 changes, to implement auto focus (auto focus, AF). In other words, the camera module 10 has functions of auto focus and optical image stabilization.

For example, the camera module 10 in this embodiment may be applied to a scenario in which a high-quality image is required. For example, the camera module 10 may be used as a camera module 10 of a rear-facing camera assembly 400 of an electronic device 1000. This is not strictly limited in this application.

For example, as shown in FIG. 14, the camera lens 2 includes a lens tube 21 and at least one lens 22 fastened in the camera lens 2. The voice coil motor 6 includes a motor frame 61, a magnet component 62, a voice coil 63, an upper spring 64, and a lower spring 65. The motor frame 61 is located within the module frame 1 and is fixedly connected to the module frame 1. The magnet component 62 is fastened within the motor frame 61. The camera lens 2 is located in the magnet component 62. The voice coil 63 is located between the lens tube 21 and the magnet component 62 and is fixedly connected to the lens tube 21. When the voice coil 63 is electrified, the camera lens 2 is actuated to shift in the direction parallel to the optical axis 20 of the camera lens 2. One side of the upper spring 64 is fixedly connected to the upper end of the lens tube 21, and the other side of the upper spring is fixedly connected to the motor frame 61. One side of the lower spring 65 is fixedly connected to the lower end of the lens tube 21, and the other side of the lower spring is fixedly connected to the motor frame 61.

Figure 15:
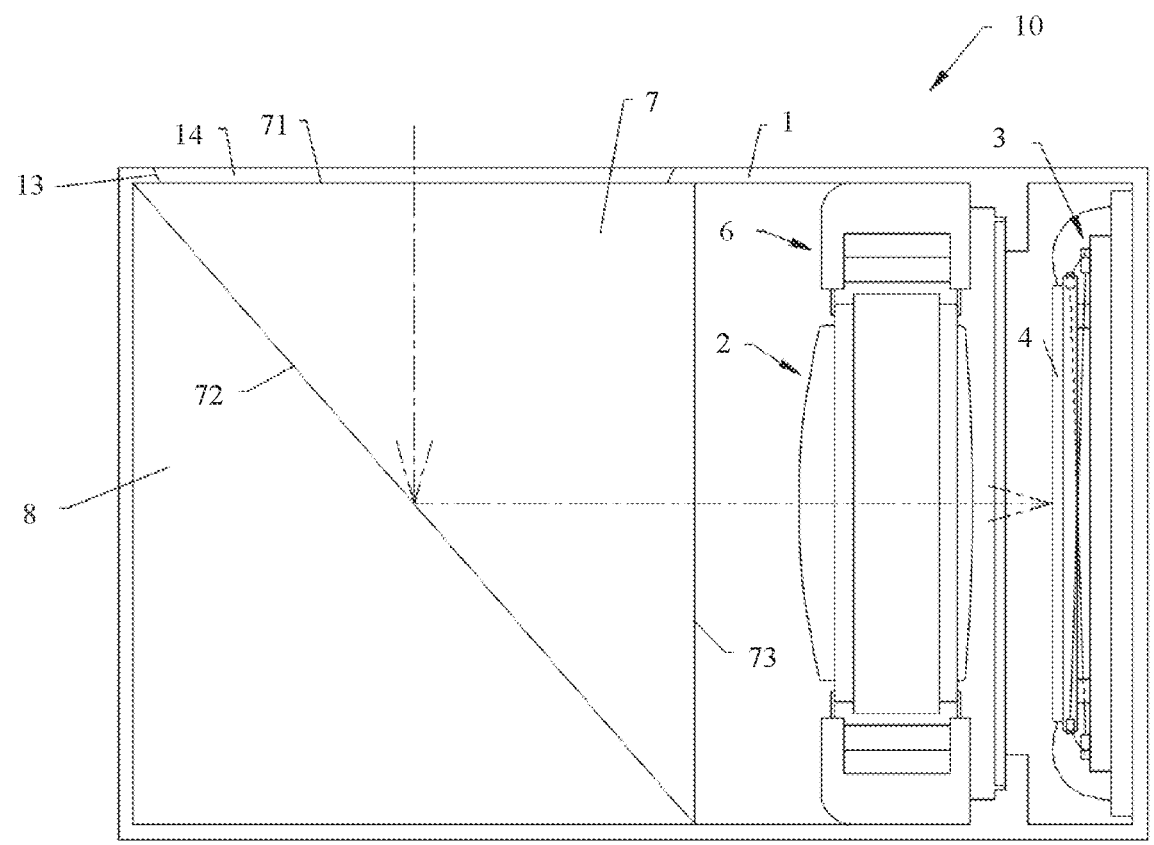
FIG. 15 is a schematic diagram of a structure of a camera module in a third embodiment according to an embodiment of this application.

FIG. 15 is a schematic diagram of a structure of a camera module 10 in a third embodiment according to an embodiment of this application. The following mainly describes differences between this embodiment and the foregoing embodiments, and most content of this embodiment that is the same as the content of the foregoing embodiments is not described again.

In some embodiments, the camera module 10 may alternatively be a periscope long-focus camera module. The camera module 10 further includes a prism (prism) 7. The prism 7 is fastened within the module frame 1 and is located on an in-light side of the camera lens 2. The module frame 1 has an in-light hole 13 that is disposed facing the prism 7. Ambient light is deflected after passing through the prism 7, so as to smoothly enter the camera lens 2. By deflecting an optical path through the prism 7, the camera module 10 can distribute its thickness in two directions, to avoid problems such as assembly difficulty caused by an excessively large module thickness. The camera module 10 includes a voice coil motor 6 configured to implement auto focus of the camera lens 2.

A conventional periscope camera module is provided with a plurality of groups of prism actuating motors, and the prism actuating motors actuate the prism to rotate to implement image stabilization. This structure is complex and difficult to implement, and has poor reliability. In this embodiment, the camera module 10 actuates, through the SMA motor 3, the image sensor 4 to shift on the plane perpendicular to the optical axis 20 of the camera lens 2, so as to implement optical image stabilization. Therefore, compared with a conventional solution, this embodiment provides the camera module 10 in which a prism actuating motor may be omitted, and the prism 7 is fastened on the module frame 1. In this way, the module structure is simplified and the structure reliability is improved if long-focus image stabilization performance is achieved.

For example, the camera module 10 further includes a prism frame 8, the prism frame 8 is fastened to the module frame 1, and the prism 7 is fastened to the prism frame 8. The prism 7 is shaped as a triangular prism. Ambient light enters the prism 7 through a cathetus side 71 of the prism 7 facing the in-light hole 13, is reflected on a hypotenuse side 72 of the prism 7, is emitted from another cathetus side 73 of the prism 7 facing the camera lens 2 to the image sensor 4 through the camera lens 2.

For example, the camera module 10 may further include an optical stop 14. The optical stop 14 is mounted on the module frame 1 and covers the in-light hole 13. The optical stop 14 may be used for light guiding, dust prevention, appearance decoration, and the like.

Figure 16:
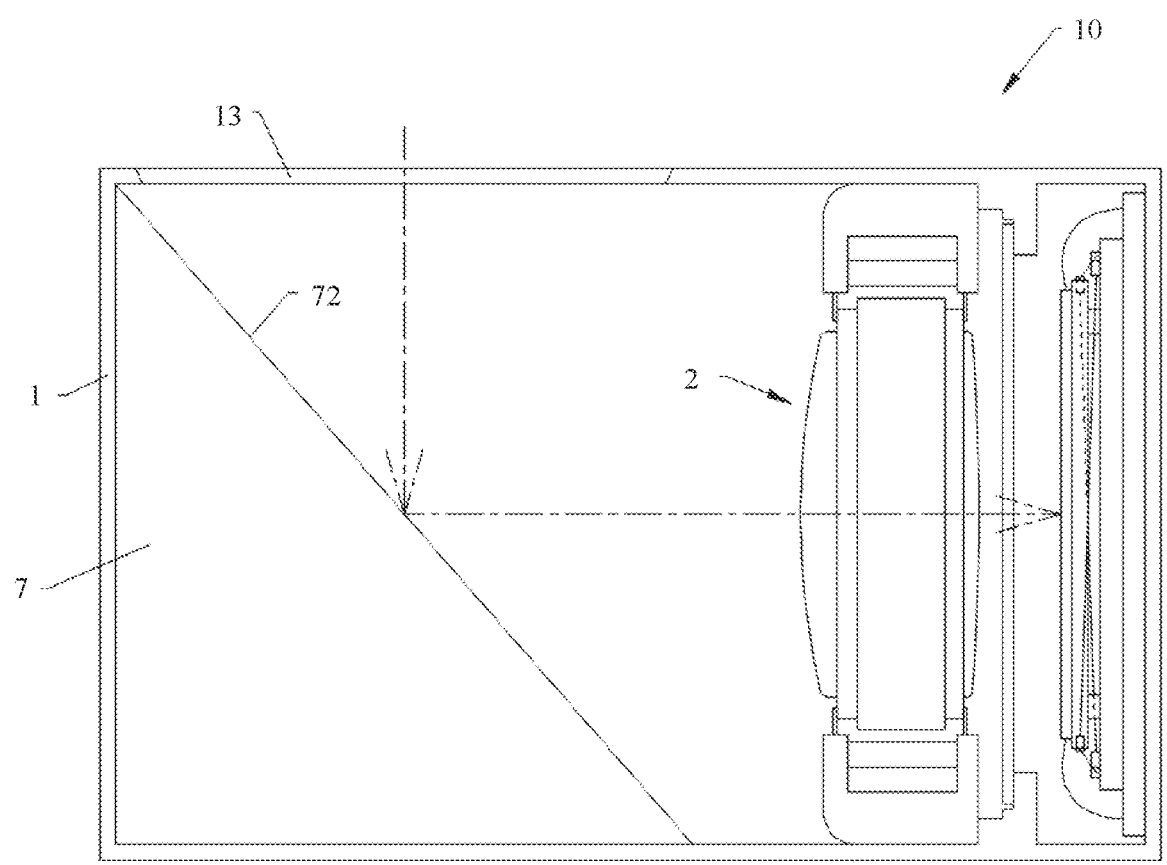
FIG. 16 is a schematic diagram of a structure of a camera module in a fourth embodiment according to an embodiment of this application.

FIG. 16 is a schematic diagram of a structure of a camera module 10 in a fourth embodiment according to an embodiment of this application. The following mainly describes differences between this embodiment and the foregoing embodiments, and most content of this embodiment that is the same as the content of the foregoing embodiments is not described again.

In this embodiment, the prism 7 is directly fastened to the module frame 1. The hypotenuse side 72 of the prism 7 faces both the in-light hole 13 and the camera lens 2. After being emitted from the hypotenuse side 72 of the prism 7, ambient light directly enters the camera lens 2, and no longer enters the prism 7. In this case, such a small loss of the ambient light in a transmission process helps improve imaging quality of the camera module 10.

For example, the camera module 10 shown in FIG. 15 and FIG. 16 may be applied to a small environment in which long-focus photographing and image stabilization are required. For example, the camera module 10 may be used as a camera module 10 of a rear-facing camera assembly 400 of an electronic device 1000. This is not strictly limited in this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. If there is no conflict, the embodiments of this application and the features in the embodiments may be combined with each other. Therefore, the protection scope of this application shall be subject to the protection scope of the claims.

What is claimed is:

1. A camera system comprising:
a frame;
a lens comprising an out-light side and having an optical axis;
an image sensor disposed on the out-light side; and a shape memory alloy (SMA) motor fastened to the image sensor and positioned such that the image sensor is located between the lens and the SMA motor, and comprising:
an upper motor component comprising a side distal from the image sensor, wherein the image sensor is fastened to the upper motor component;
a lower motor component located on the side of the upper motor component distal from the image sensor;
a plurality of holds, wherein the holds are disposed between the lower motor component and the upper motor component, wherein a first end of each of the holds is affixed to the lower motor component, and wherein a second end of each of the holds is slidably connected to the upper motor component; and
four SMA cables, wherein one end of each of the SMA cables is fastened to the upper motor component and the other end of each of the SMA cables is fastened to the lower motor component, wherein the SMA cables are configured to shrink when being electrified and heated, wherein the SMA cables are arranged in two pairs symmetrically disposed relative to a first reference plane, wherein two of the SMA cables of a same pair are symmetrically disposed relative to a second reference plane, and wherein both the first reference plane and the second reference plane are traversed by the optical axis.

2. The camera system of claim 1, wherein the upper motor component comprises a first side and a second side, wherein the first side and the second side are symmetrically disposed relative to the second reference plane, wherein the lower motor component comprises a middle region facing the upper motor component and edge regions disposed around the middle region, wherein the holds are fastened to the middle region, and wherein the edge regions comprise a first edge region and a fourth edge region, the first edge region and the fourth edge region are symmetrically disposed relative to the first reference plane, and the first edge region and the first side are correspondingly disposed, wherein the four SMA cables comprise a first SMA cable, a second SMA cable, a third SMA cable, and a fourth SMA cable, wherein one end of the first SMA cable is fastened to an end of the first side of the upper motor component closest to the second side, and wherein the other end of the first SMA cable is fastened to one end of the first edge region of the lower motor component closest to the fourth edge region, wherein the second SMA cable and the first SMA cable are symmetrically disposed relative to the second reference plane, wherein the third SMA cable and the second SMA cable are symmetrically disposed relative to the first reference plane, and wherein the fourth SMA cable and the third SMA cable are symmetrically disposed relative to the second reference plane.

3. The camera system of claim 2, wherein the SMA motor further comprises two L-shaped spring arms, wherein each of the spring arms comprises a fixed end and a movable end, wherein the movable ends are fastened to the upper motor component, wherein the fixed ends are fastened to the middle region, wherein the two spring arms are disposed in a centrosymmetric manner, and wherein a symmetric center of the two spring arms is an intersection line of the first reference plane and the second reference plane.

4. The camera system of claim 3, wherein each of the spring arms comprises a first branch and a second branch connected to the first branch, wherein an end of the first branch distal from the second branch and an end of the second branch distal from the first branch define a movable end of the spring arm, and wherein the other end of the spring arm is fixed, and wherein the upper motor component further comprises a fourth side, wherein the fourth side and the first side are symmetrically disposed relative to the first reference plane, wherein the first branch of one of the two spring arms is parallel to the first side, and wherein the second branch of one of the two spring arms is parallel to the fourth side.

5. The camera system of claim 2, wherein the SMA motor further comprises four spring arms, wherein each of the spring arms comprises a fixed end and a movable end, wherein the movable ends of the spring arms are fastened to the upper motor component, wherein the fixed ends of the spring arms are fastened to the middle region, the four spring arms are arranged in two pairs, wherein the two pairs of spring arms are symmetrically disposed relative to the first reference plane, and wherein two spring arms of a same pair are symmetrically disposed relative to the second reference plane.

6. The camera system of claim 1, wherein the SMA motor further comprises a circuit board disposed on a side of the lower motor component distal from the upper motor component and affixed to the frame, and wherein the image sensor is electrically connected to the circuit board through a plurality of bonding wires.

7. The camera system of claim 1, wherein the SMA motor further comprises:
a circuit board disposed on a side of the lower motor component distal from the upper motor component and is affixed to the frame;
a first electric conductor disposed on the upper motor component;
a second electric conductor disposed on a hold;
a third electric conductor disposed on the lower motor component; and
a fourth electric conductor disposed on the lower motor component,
wherein the third electric conductor electrically connects the circuit board to one end of the SMA cable, wherein the other end of the SMA cable is electrically connected to the first electric-conductor, wherein the first electric conductor is electrically connected to the fourth electric conductor through the second electric conductor, and wherein the fourth electric conductor is electrically connected to the circuit board.

8. The camera system of claim 1, wherein the lens comprises a lens tube and a lens fastened in the lens tube, and wherein the lens tube is affixed to the frame.

9. The camera system of claim 1, wherein the camera further comprises a voice coil motor fastened within the frame, wherein the lens is mounted on the voice coil motor, and wherein the voice coil motor is configured to actuate the lens to shift in a direction parallel to the optical axis of the lens.

10. The camera system of claim 9, wherein the lens comprises a lens tube and a lens fastened in the lens tube, wherein the voice coil motor comprises:
a motor frame affixed within the camera frame;
a magnet component affixed within the motor frame, wherein the lens is disposed on the magnet component;
a voice coil affixed to the lens tube and disposed between the lens tube and the magnet component in a configuration wherein when the voice coil is activated, the lens may shift in a direction parallel to the optical axis of the lens;
an upper spring, wherein one side of the upper spring is affixed to an upper end of the lens tube, and wherein the other side of the upper spring is affixed to the motor frame; and
a lower spring, wherein one side of the lower spring is affixed to a lower end of the lens tube, and wherein the other side of the lower spring is affixed to the motor frame.

11. The camera system of claim 1, wherein the camera further comprises a prism fastened within the frame on an in-light side of the lens, wherein the frame comprises an in-light hole configured to admit light into the prism.

12. An electronic device comprising:
a housing;
a processor; and
a camera, wherein the processor and the camera are accommodated in the housing, wherein the camera is electrically connected to the processor and wherein the camera comprises:
a frame;
a lens comprising an out-light side and having an optical axis;
an image sensor disposed on the out-light side; and
a shape memory alloy (SMA) motor fastened to the image sensor and positioned such that the image sensor is located between the lens and the SMA motor, and comprising:
an upper motor component comprising a side distal from the image sensor, wherein the image sensor is fastened to the upper motor component;
a lower motor component located on the side of the upper motor component distal from the image sensor;
a plurality of holds, wherein the holds are disposed between the lower motor component and the upper motor component, wherein a first end of each of the holds is affixed to the lower motor component, and wherein a second end of each of the holds is slidably connected to the upper motor component; and
four SMA cables, wherein one end of each of the SMA cables is fastened to the upper motor component and the other end of each of the SMA cables is fastened to the lower motor component, wherein the SMA cables are configured to shrink when being electrified and heated, wherein the SMA cables are arranged in two pairs symmetrically disposed relative to a first reference plane, wherein two of the SMA cables of a same pair are symmetrically disposed relative to a second reference plane, and wherein both the first reference plane and the second reference plane are traversed by the optical axis.

13. The electronic device of claim 12, wherein the upper motor component comprises a first side and a second side, and wherein the first side and the second side are symmetrically disposed relative to the second reference plane, wherein the lower motor component comprises a middle region facing the upper motor component and edge regions disposed around the middle region, wherein the plurality of holds are fastened to the middle region, wherein the edge regions comprise a first edge region and a fourth edge region, the first edge region and the fourth edge region are symmetrically disposed relative to the first reference plane, and the first edge region and the first side are correspondingly disposed, wherein the four SMA cables comprise a first SMA cable, a second SMA cable, a third SMA cable, and a fourth SMA cable, wherein one end of the first SMA cable is fastened to an end of the first side of the upper motor component closest to the second side, wherein the other end of the first SMA cable is fastened to one end of the first edge region of the lower motor component closest to the fourth edge region, wherein the second SMA cable and the first SMA cable are symmetrically disposed relative to the second reference plane, wherein the third SMA cable and the second SMA cable are symmetrically disposed relative to the first reference plane, and wherein the fourth SMA cable and the third SMA cable are symmetrically disposed relative to the second reference plane.

14. The electronic device of claim 13, wherein the SMA motor further comprises two L-shaped spring arms, wherein each of the spring arms comprises a fixed end and a movable end, wherein the movable ends are fastened to the upper motor component, wherein the fixed ends are fastened to the middle region, wherein the two spring arms are disposed in a centrosymmetric manner, and wherein a symmetric center of the two spring arms is an intersection line of the first reference plane and the second reference plane.

15. The electronic device of claim 14, wherein each of the spring arms comprises a first branch and a second branch connected to the first branch, wherein an end of the first branch distal from the second branch and an end of the second branch distal from the first branch define a movable end of the spring arm, and wherein the other end of the spring arm is fixed, wherein the upper motor component further comprises a fourth side, wherein the fourth side and the first side are symmetrically disposed relative to the first reference plane, wherein the first branch of one of the spring arms is parallel to the first side, and wherein the second branch of one of the spring arms is parallel to the fourth side.

16. The electronic device of claim 13, wherein the SMA motor further comprises four spring arms, wherein each of the spring arms comprises a fixed end and a movable end, wherein the movable ends are fastened to the upper motor component, wherein the fixed ends are fastened to the middle region, wherein the four spring arms are arranged in two pairs, wherein the two pairs of spring arms are symmetrically disposed relative to the first reference plane, and wherein two spring arms of a same pair are symmetrically disposed relative to the second reference plane.

17. The electronic device of claim 12, wherein the SMA motor further comprises a circuit board disposed on a side of the lower motor component distal from the upper motor component and affixed to the frame, and wherein the image sensor is electrically connected to the circuit board through a plurality of bonding wires.

18. The electronic device of claim 12, wherein the SMA motor further comprises:
a circuit board disposed on a side of the lower motor component distal from the upper motor component and is affixed to the frame;
a first electric conductor disposed on the upper motor component;
a second electric conductor disposed on a hold;

a third electric conductor disposed on the lower motor component; and a fourth electric conductor disposed on the lower motor component, wherein the third electric conductor electrically connects the circuit board to one end of the SMA cable, wherein the other end of the SMA cable is electrically connected to the first electric conductor, wherein the first electric conductor is electrically connected to the fourth electric conductor through the second electric conductor, and wherein the fourth electric conductor is electrically connected to the circuit board.

19. The electronic device of claim 13, wherein the camera further comprises:

a lens tube, wherein the lens is accommodated within the lens tube; and a voice coil motor (VCM) fastened within the frame, and comprising:

a motor frame affixed within the camera frame;

a magnet component affixed within the motor frame, wherein the lens is disposed on the magnet component;

a voice coil affixed to the lens tube and disposed between the lens tube and the magnet component in a configuration wherein when the voice coil is activated, the lens may shift in a direction parallel to the optical axis of the lens;

an upper spring, wherein one side of the upper spring is affixed to an upper end of the lens tube, and wherein the other side of the upper spring is affixed to the motor frame; and a lower spring, wherein one side of the lower spring is affixed to a lower end of the lens tube, and wherein the other side of the lower spring is affixed to the motor frame.

20. The electronic device of claim 12, wherein the camera further comprises a prism fastened within the frame on an in-light side of the lens, and wherein the frame comprises an in-light hole configured to admit light into the prism.

* * * * *

UNITED STATES PATENT AND TRADEMARK OFFICE
CERTIFICATE OF CORRECTION

PATENT NO. : 12,177,549 B2
APPLICATION NO. : 17/780899
DATED : December 24, 2024
INVENTOR(S) : Xin Li, Gang Wang and Wei Tang Page 1 of 1

It is certified that error appears in the above-identified patent and that said Letters Patent is hereby corrected as shown below:

In the Claims

Claim 19, Column 29, Line 13: "claim 13" should read "claim 12"

Signed and Sealed this
Eighteenth Day of February, 2025

Coke Morgan Stewart
*Acting Director of the United States Patent and Trademark Office*